(12) United States Patent
Downing

(10) Patent No.: US 10,477,618 B2
(45) Date of Patent: Nov. 12, 2019

(54) NETWORKED BATTLE SYSTEM OR FIREARM

(71) Applicant: Colt Canada Corporation, Kitchener (CA)

(72) Inventor: Warren Downing, Ottawa (CA)

(73) Assignee: COLT CANADA IP HOLDING PARTNERSHIP, Kitchener, Ontario ( * ) Notice: Subject to any disclaimer, the term of this patent is extended or adjusted under 35 U.S.C. 154(b) by 656 days.

(21) Appl. No.: 14/476,210

(22) Filed: Sep. 3, 2014

(65) Prior Publication Data

US 2015/0300786 A1    Oct. 22, 2015

Related U.S. Application Data

(60) Provisional application No. 62/003,006, filed on May 26, 2014, provisional application No. 61/976,157, (Continued)

(51) Int. Cl.

| | |
|---|---|
| *F41G 3/26* | (2006.01) |
| *F41G 3/28* | (2006.01) |
| *H04W 84/12* | (2009.01) |
| *F41G 3/02* | (2006.01) |
| *F41G 3/04* | (2006.01) |
| *F41G 3/16* | (2006.01) |
| *F41G 11/00* | (2006.01) |
| *F41G 9/00* | (2006.01) |

(52) U.S. Cl.
CPC .............. *H04W 84/12* (2013.01); *F41G 3/02* (2013.01); *F41G 3/04* (2013.01); *F41G 3/16* (2013.01); *F41G 9/00* (2013.01); *F41G 11/003* (2013.01)

(58) Field of Classification Search
CPC ........................................................ F41G 3/26
USPC ........................................................ 235/404
See application file for complete search history.

(56) References Cited

U.S. PATENT DOCUMENTS

| | | |
|---|---|---|
| 1,950,835 A | 3/1934 | Zajac |
| 4,533,980 A | 8/1985 | Hayes |
| (Continued) | | |

FOREIGN PATENT DOCUMENTS

| | | |
|---|---|---|
| CA | 2547081 | 6/2005 |
| CA | 2537839 | 9/2005 |
| (Continued) | | |

OTHER PUBLICATIONS

Merriam Webster. Map | Definition of Map by Merriam-Webster. [Retrieved Jun. 14, 2017]. < https://www.merriam-webster.com/dictionary/map>.*

(Continued)

*Primary Examiner* — Toan C Ly
(74) *Attorney, Agent, or Firm* — Cantor Colburn LLP

(57) ABSTRACT

A networked battle system includes a communication network, a first rifle that includes at least one accessory coupled thereto that determines a bearing of the first rifle and a communication element allowing the at least one accessory to provide bearing information to the communication network. The system also includes a battle management system in communication with the first rifle through the communication network that receives the bearing information from the accessory and updates a battle plan based on the bearing information to form an updated battle plan.

25 Claims, 35 Drawing Sheets

Related U.S. Application Data filed on Apr. 7, 2014, provisional application No. 61/875,468, filed on Sep. 9, 2013.

(56) References Cited

U.S. PATENT DOCUMENTS

| | | | |
|---|---|---|---|
| 5,033,219 A | 7/1991 | Johnson et al. | |
| 5,142,806 A | 9/1992 | Swan | |
| 5,237,773 A | 8/1993 | Claridge | |
| 5,345,707 A | 9/1994 | Randall | |
| 5,360,949 A | 11/1994 | Duxbury | |
| 5,555,662 A | 9/1996 | Teetzel | |
| 5,557,872 A | 9/1996 | Langner | |
| 5,654,594 A | 8/1997 | Bjornsen, III et al. | |
| 5,669,174 A | 9/1997 | Teetzel | |
| 5,822,905 A | 10/1998 | Teetzel | |
| 5,826,363 A | 10/1998 | Olson | |
| 5,831,841 A | 11/1998 | Nishino | |
| 6,163,131 A | 12/2000 | Gartstein et al. | |
| 6,219,952 B1 | 4/2001 | Mossberg et al. | |
| 6,237,271 B1 | 5/2001 | Kaminski | |
| 6,412,207 B1 | 7/2002 | Crye et al. | |
| 6,430,861 B1 | 8/2002 | Ayers et al. | |
| 6,490,822 B1 | 12/2002 | Swan | |
| 6,499,245 B1 | 12/2002 | Swan | |
| 6,508,027 B1 | 1/2003 | Kim | |
| 6,513,251 B2 | 2/2003 | Huang et al. | |
| 6,618,976 B1 | 9/2003 | Swan | |
| 6,622,416 B2 | 9/2003 | Kim | |
| 6,779,288 B1 | 8/2004 | Kim | |
| 6,792,711 B2 | 9/2004 | Battaglia | |
| 6,847,587 B2 | 1/2005 | Patterson et al. | |
| 6,849,811 B1 | 2/2005 | Heflin et al. | |
| 6,854,206 B2 | 2/2005 | Oz | |
| 6,865,599 B2 | 3/2005 | Zhang | |
| 6,895,708 B2 | 5/2005 | Kim et al. | |
| 6,899,539 B1 | 5/2005 | Stallman et al. | |
| 6,918,066 B2 | 7/2005 | Dutta et al. | |
| 6,925,744 B2 | 8/2005 | Kincel | |
| 6,931,775 B2 | 8/2005 | Burnett | |
| 7,007,586 B2 | 3/2006 | Larroque-Lahitette et al. | |
| 7,059,076 B2 | 6/2006 | Stoner et al. | |
| 7,096,619 B2 | 8/2006 | Jackson et al. | |
| 7,121,036 B1 | 10/2006 | Florence et al. | |
| 7,124,531 B1 | 10/2006 | Florence et al. | |
| 7,131,228 B2 | 11/2006 | Hochstrate et al. | |
| 7,144,830 B2 | 12/2006 | Hill et al. | |
| RE39,465 E | 1/2007 | Swan | |
| 7,216,451 B1 | 5/2007 | Troy | |
| 7,231,606 B2 | 6/2007 | Miller et al. | |
| 7,243,454 B1 | 7/2007 | Cahill | |
| D556,289 S | 11/2007 | Yu | |
| 7,316,003 B1 | 1/2008 | Dulepet et al. | |
| RE40,216 E | 4/2008 | Swan | |
| 7,363,741 B2 | 4/2008 | Desomma et al. | |
| 7,421,817 B2 | 9/2008 | Larsson | |
| 7,421,818 B2 | 9/2008 | Houde-Walter | |
| 7,438,430 B2 | 10/2008 | Kim | |
| 7,458,179 B2 | 12/2008 | Swan | |
| 7,461,346 B2 | 12/2008 | Fildebrandt | |
| 7,464,495 B2 | 12/2008 | Cahill | |
| 7,523,580 B1 | 4/2009 | Tankersley | |
| 7,525,203 B1 | 4/2009 | Racho | |
| 7,548,697 B2 | 6/2009 | Hudson et al. | |
| 7,551,121 B1 | 6/2009 | O'Connell et al. | |
| 7,554,316 B2 | 6/2009 | Stevens et al. | |
| 7,559,169 B2 | 7/2009 | Hung et al. | |
| 7,562,483 B2 | 7/2009 | Hines | |
| 7,584,569 B2 | 9/2009 | Kallio et al. | |
| 7,605,496 B2 | 10/2009 | Stevens et al. | |
| 7,627,975 B1 | 12/2009 | Hines | |
| 7,640,690 B2 | 1/2010 | Hines | |
| 7,676,975 B2 | 3/2010 | Phillips et al. | |
| 7,698,983 B1 | 4/2010 | Pinto et al. | |
| D616,521 S | 5/2010 | Starnes | |
| 7,707,762 B1 | 5/2010 | Swan | |
| 7,712,241 B2 | 5/2010 | Teetzel et al. | |
| 7,750,814 B2 | 7/2010 | Fisher et al. | |
| 7,775,150 B2 | 8/2010 | Hochstrate et al. | |
| 7,793,452 B1 | 9/2010 | Samson et al. | |
| 7,818,910 B2 | 10/2010 | Young | |
| 7,841,120 B2 | 11/2010 | Teetzel et al. | |
| 7,866,083 B2 | 1/2011 | Teetzel | |
| 7,868,587 B2 | 1/2011 | Stevens et al. | |
| 7,908,784 B2 | 3/2011 | Kim | |
| 7,909,490 B2 | 3/2011 | Chou et al. | |
| 7,953,369 B2 | 5/2011 | Baarman | |
| 7,954,971 B1 | 6/2011 | Kincaid et al. | |
| 7,975,419 B2 | 7/2011 | Darian | |
| 7,985,527 B2 | 7/2011 | Tokunaga | |
| 7,990,147 B2 | 8/2011 | Driemel et al. | |
| 7,994,752 B2 | 8/2011 | Soar | |
| 8,001,715 B2 | 8/2011 | Stokes | |
| 8,005,995 B2 | 8/2011 | Ito et al. | |
| 8,028,459 B2 | 10/2011 | Williams | |
| 8,028,460 B2 | 10/2011 | Williams | |
| 8,035,340 B2 | 10/2011 | Stevens et al. | |
| 8,039,995 B2 | 10/2011 | Stevens et al. | |
| 8,042,967 B2 | 10/2011 | Hikmet et al. | |
| 8,063,773 B2 | 11/2011 | Fisher | |
| 8,091,265 B1 | 1/2012 | Teetzel et al. | |
| 8,104,211 B2 | 1/2012 | Darian | |
| 8,141,288 B2 | 3/2012 | Dodd et al. | |
| 8,146,282 B2 | 4/2012 | Cabahug et al. | |
| 8,151,505 B2 | 4/2012 | Thompson | |
| 8,225,542 B2 | 7/2012 | Houde-Walter | |
| 8,251,288 B2 | 8/2012 | Woitalla et al. | |
| 8,311,757 B2 | 11/2012 | Lin | |
| 8,336,776 B2 | 12/2012 | Horvath et al. | |
| 8,347,541 B1 | 1/2013 | Thompson | |
| 8,371,729 B2 | 2/2013 | Sharrah et al. | |
| 8,453,369 B1 | 6/2013 | Kincaid et al. | |
| 8,458,944 B2 | 6/2013 | Houde-Walter | |
| 8,464,459 B1 | 6/2013 | Summers | |
| 8,485,085 B2 | 7/2013 | Goree et al. | |
| 8,495,945 B1 | 7/2013 | Kirchner et al. | |
| 8,516,731 B2 | 8/2013 | Cabahug et al. | |
| 8,528,244 B2 | 9/2013 | Scallie et al. | |
| 8,572,292 B2 | 10/2013 | Ito et al. | |
| 8,635,798 B2 | 1/2014 | Mulfinger | |
| 8,668,496 B2 | 3/2014 | Nolen | |
| 8,739,672 B1 | 6/2014 | Kelly | |
| 8,826,575 B2 | 9/2014 | Ufer et al. | |
| 9,010,002 B2 | 4/2015 | Popa-Simil | |
| 9,151,564 B1 | 10/2015 | Baxter | |
| 2002/0174588 A1 | 11/2002 | Danner et al. | |
| 2003/0029072 A1 | 2/2003 | Danielson et al. | |
| 2003/0074822 A1 | 4/2003 | Faifer | |
| 2003/0106251 A1 | 6/2003 | Kim | |
| 2004/0121292 A1 | 6/2004 | Chung et al. | |
| 2004/0198336 A1 | 10/2004 | Jancic et al. | |
| 2004/0241622 A1 | 12/2004 | White | |
| 2005/0000142 A1 | 1/2005 | Kim et al. | |
| 2005/0018041 A1 | 1/2005 | Towery et al. | |
| 2005/0033544 A1 | 2/2005 | Brooks et al. | |
| 2005/0109201 A1 | 5/2005 | Larroque-Lahitette et al. | |
| 2005/0204603 A1 | 9/2005 | Larsson | |
| 2005/0217161 A1 | 10/2005 | Haugen et al. | |
| 2005/0241206 A1 | 11/2005 | Teetzel et al. | |
| 2005/0241211 A1 | 11/2005 | Swan | |
| 2005/0268521 A1 | 12/2005 | Cox et al. | |
| 2006/0005447 A1 | 1/2006 | Lenner et al. | |
| 2006/0204935 A1 | 9/2006 | McAfee et al. | |
| 2006/0288626 A1 | 12/2006 | Kim | |
| 2007/0006509 A1 | 1/2007 | Desomma et al. | |
| 2007/0150556 A1 | 6/2007 | Fukuda et al. | |
| 2007/0216392 A1 | 9/2007 | Stevens et al. | |
| 2007/0228833 A1 | 10/2007 | Stevens et al. | |
| 2008/0010890 A1 | 1/2008 | Vice et al. | |
| 2008/0039962 A1* | 2/2008 | McRae | F41A 17/06 700/90 |
| 2008/0040965 A1 | 2/2008 | Solinsky et al. | |
| 2008/0063400 A1 | 3/2008 | Hudson et al. | |
| 2008/0092422 A1 | 4/2008 | Daniel et al. | |
| 2008/0108021 A1 | 5/2008 | Slayton et al. | |

(56) References Cited

U.S. PATENT DOCUMENTS

| | | |
|---|---|---|
| 2008/0134562 A1 | 6/2008 | Teetzel |
| 2008/0170838 A1 | 7/2008 | Teetzel et al. |
| 2008/0190002 A1 | 8/2008 | Hines |
| 2008/0204361 A1 | 8/2008 | Scales et al. |
| 2008/0216380 A1 | 9/2008 | Teetzel |
| 2008/0219100 A1 | 9/2008 | Fisher et al. |
| 2008/0301994 A1 | 12/2008 | Langevin et al. |
| 2009/0044439 A1 | 2/2009 | Phillips et al. |
| 2009/0058361 A1 | 3/2009 | John |
| 2009/0108589 A1 | 4/2009 | Racho et al. |
| 2009/0134713 A1 | 5/2009 | Stevens et al. |
| 2009/0218884 A1 | 9/2009 | Soar |
| 2009/0249216 A1 | 10/2009 | Charka et al. |
| 2009/0255160 A1 | 10/2009 | Summers et al. |
| 2009/0305197 A1 | 12/2009 | Lim et al. |
| 2009/0322158 A1 | 12/2009 | Stevens et al. |
| 2010/0031552 A1 | 2/2010 | Houde-Walter et al. |
| 2010/0083553 A1 | 4/2010 | Montgomery et al. |
| 2010/0095574 A1 | 4/2010 | Abst et al. |
| 2010/0122485 A1 | 5/2010 | Kincel |
| 2010/0126054 A1 | 5/2010 | Daniel et al. |
| 2010/0154276 A1 | 6/2010 | Kim |
| 2010/0154280 A1 | 6/2010 | Lafrance et al. |
| 2010/0175293 A1 | 7/2010 | Hines |
| 2010/0180485 A1 | 7/2010 | Cabahug et al. |
| 2010/0181933 A1 | 7/2010 | Langovsky et al. |
| 2010/0186278 A1 | 7/2010 | Daniel |
| 2010/0192443 A1 | 8/2010 | Cabahug et al. |
| 2010/0192444 A1 | 8/2010 | Cabahug et al. |
| 2010/0192446 A1 | 8/2010 | Darian |
| 2010/0192447 A1 | 8/2010 | Cabahug et al. |
| 2010/0192448 A1 | 8/2010 | Darian et al. |
| 2010/0196859 A1 | 8/2010 | Saugen et al. |
| 2010/0218410 A1 | 9/2010 | Cabahug et al. |
| 2010/0229448 A1 | 9/2010 | Houde-Walter et al. |
| 2010/0242332 A1 | 9/2010 | Teetzel et al. |
| 2010/0275489 A1 | 11/2010 | Cabahug et al. |
| 2010/0279544 A1 | 11/2010 | Dodd et al. |
| 2010/0281725 A1 | 11/2010 | Arbouw |
| 2011/0000120 A1 | 1/2011 | Thompson et al. |
| 2011/0006613 A1 | 1/2011 | Stevens et al. |
| 2011/0010979 A1 | 1/2011 | Houde-Walter et al. |
| 2011/0030257 A1 | 2/2011 | Gwillim, Jr. et al. |
| 2011/0031928 A1 | 2/2011 | Soar |
| 2011/0036337 A1 | 2/2011 | Freitag et al. |
| 2011/0061284 A1 | 3/2011 | Cabahug et al. |
| 2011/0089894 A1 | 4/2011 | Soar |
| 2011/0099876 A1 | 5/2011 | Bentley |
| 2011/0126622 A1 | 6/2011 | Turner |
| 2011/0131858 A1 | 6/2011 | Darian et al. |
| 2011/0162245 A1 | 7/2011 | Kamal |
| 2011/0162251 A1 | 7/2011 | Houde-Walter |
| 2011/0173865 A1 | 7/2011 | Compton et al. |
| 2011/0214328 A1 | 9/2011 | Williams et al. |
| 2011/0239354 A1 | 10/2011 | Celona et al. |
| 2011/0252741 A1 | 10/2011 | Travez et al. |
| 2011/0264257 A1 | 10/2011 | Travez et al. |
| 2011/0271822 A1 | 11/2011 | Myr |
| 2011/0283585 A1 | 11/2011 | Cabahug et al. |
| 2011/0283586 A1 | 11/2011 | Scallie et al. |
| 2011/0285214 A1 | 11/2011 | Stevens et al. |
| 2011/0306251 A1 | 12/2011 | Mulfinger et al. |
| 2012/0021385 A1 | 1/2012 | Belenkii et al. |
| 2012/0068536 A1 | 3/2012 | Stevens et al. |
| 2012/0085331 A1 | 4/2012 | Lang et al. |
| 2012/0097741 A1 | 4/2012 | Karcher |
| 2012/0125092 A1 | 5/2012 | Downing |
| 2012/0125189 A1 | 5/2012 | McLean, III et al. |
| 2012/0131837 A1 | 5/2012 | Cabahug et al. |
| 2012/0143368 A1 | 6/2012 | Travez et al. |
| 2012/0144714 A1 | 6/2012 | Cabahug et al. |
| 2012/0144716 A1 | 6/2012 | Cabahug et al. |
| 2012/0180363 A1 | 7/2012 | Frascati et al. |
| 2012/0180364 A1 | 7/2012 | Berntsen et al. |
| 2012/0192476 A1 | 8/2012 | Compton et al. |
| 2012/0214137 A1* | 8/2012 | Goree ............... F41A 17/063 434/19 |
| 2012/0233901 A1 | 9/2012 | Kim et al. |
| 2012/0285064 A1 | 11/2012 | Houde-Walter et al. |
| 2012/0317706 A1 | 12/2012 | Lebel et al. |
| 2013/0047482 A1 | 2/2013 | Mulfinger et al. |
| 2013/0047486 A1 | 2/2013 | Ding et al. |
| 2013/0061504 A1 | 3/2013 | Malherbe et al. |
| 2013/0061509 A1 | 3/2013 | Allen et al. |
| 2013/0104438 A1 | 5/2013 | Hines et al. |
| 2013/0104439 A1 | 5/2013 | Hines et al. |
| 2013/0105579 A1* | 5/2013 | Miller ............... F41G 3/04 235/400 |
| 2013/0185978 A1 | 7/2013 | Dodd et al. |
| 2013/0286239 A1 | 10/2013 | Lupher et al. |
| 2013/0329211 A1 | 12/2013 | McHale et al. |
| 2013/0337415 A1* | 12/2013 | Huet ............... F41G 3/26 434/21 |
| 2013/0344461 A1 | 12/2013 | Tello |
| 2014/0007485 A1 | 1/2014 | Castejon, Sr. |
| 2014/0028856 A1 | 1/2014 | Ehrlich |
| 2014/0047754 A1 | 2/2014 | Compton et al. |
| 2014/0052578 A1 | 2/2014 | Redwood |
| 2014/0052878 A1 | 2/2014 | Ito et al. |
| 2014/0059911 A1 | 3/2014 | Oh et al. |
| 2014/0068990 A1 | 3/2014 | Cabahug et al. |
| 2014/0130392 A1 | 5/2014 | Oh et al. |
| 2014/0184476 A1 | 7/2014 | McHale et al. |
| 2014/0360081 A1 | 12/2014 | Lupher et al. |
| 2014/0378088 A1 | 12/2014 | Goel et al. |
| 2015/0020427 A1 | 1/2015 | Compton et al. |
| 2015/0026588 A1 | 1/2015 | Turcotte et al. |
| 2015/0041538 A1 | 2/2015 | Teetzel et al. |
| 2015/0108215 A1 | 4/2015 | Ehrlich |
| 2015/0176949 A1 | 6/2015 | Varshneya |
| 2015/0285593 A1 | 10/2015 | Dribben |
| 2015/0285599 A1 | 10/2015 | Downing |
| 2015/0345887 A1 | 12/2015 | Shneorson |
| 2015/0345906 A1 | 12/2015 | Varshneya |
| 2015/0369554 A1 | 12/2015 | Kramer |
| 2016/0025462 A1 | 1/2016 | Downing |
| 2016/0254462 A1 | 1/2016 | Downing et al. |
| 2016/0033221 A1 | 2/2016 | Schmehl |
| 2016/0084617 A1 | 3/2016 | Lyren |
| 2016/0169627 A1 | 6/2016 | Northrup |
| 2016/0216082 A1 | 7/2016 | Downing |
| 2016/0223278 A1 | 8/2016 | Schechter |
| 2016/0316128 A1 | 10/2016 | Teich |

FOREIGN PATENT DOCUMENTS

| | | |
|---|---|---|
| CA | 2756018 | 9/2010 |
| CA | 2754852 | 11/2010 |
| CA | 2754869 | 11/2010 |
| CA | 2923506 | 3/2015 |
| DE | 2251670 | 5/1974 |
| DE | 102004045753 | 3/2006 |
| EP | 2587659 A1 | 5/2013 |
| TW | 200715159 A | 4/2007 |
| WO | 2005080908 A2 | 9/2005 |
| WO | 2005109597 A1 | 11/2005 |
| WO | 2007107975 A1 | 9/2007 |
| WO | 2008048116 A1 | 4/2008 |
| WO | 2008108818 A2 | 9/2008 |
| WO | 2009127354 A2 | 10/2009 |
| WO | 2009125171 A2 | 12/2009 |
| WO | 2010004470 | 1/2010 |
| WO | 2010107324 A1 | 9/2010 |
| WO | 2011079233 A2 | 6/2011 |
| WO | 2011162245 A1 | 12/2011 |
| WO | 2013066472 | 5/2013 |
| WO | 2013112242 | 8/2013 |
| WO | 2013120015 A1 | 8/2013 |

(56) References Cited

FOREIGN PATENT DOCUMENTS

| WO | 2014026274 A1 | 2/2014 |
|---|---|---|
| WO | 2015031993 A1 | 3/2015 |

OTHER PUBLICATIONS

English Abstract of DE102004045753.
International Preliminary Report on Patentability of the International Searching Authority, or the Declaration for PCT/CA2012/050080; dated Aug. 29, 2013, 6 pages.
International Search Report and the Written Opinion of the International Searching Authority, or the Declaration; for PCT/CA2012/005080; dated May 16, 2012, 13 pages.
International Search Report and the Written Opinion of the International Searching Authority, or the Declaration; for PCT/CA2014/050837; dated Oct. 27, 2014, 20 Pages.
International Search Report and the Written Opinion of the International Searching Authority, or the Declaration; for PCT/CA2014/050854; dated Nov. 6, 2014, 8 Pages.
International Search Report and the Written Opinion of the International Searching Authority, or the Declaration; for PCT/CA2010/000039 dated Oct. 15, 2010, 9 Pages.
Corrected International Search Report and the Written Opinion of the International Searching Authority, or the Declaration; for PCT/CA2012/050080; dated Jun. 4, 2012, 16 pages.
International Search Report and the Written Opinion of the International Searching Authority, or the Declaration; for PCT/CA2013/050598; dated Nov. 8, 2013, 13 Pages.
International Preliminary Report on Patentability of the International Searching Authority, or the Declaration for PCT/CA2013/050598; dated Sep. 4, 20014, 52 pages.
Machine Translation of claims of DE102004045753.
Machine Translation of Specification of DE102004045753.
Notification of Transmittal of the International Search Report and the Written Opinion of the International Searching Authority, or the Declaration; PCT/CA2014/051006; dated Dec. 23, 2014, 9 Pages.
Singapore Search Report dated Oct. 15, 2013 for Application No. 201205195-9, 18 Pages.
Notification of Transmittal of the International Preliminary Report on Patentability and the Written Opinion of the International Searching Authority, or the Declaration; PCT/CA2015/0051369; dated Mar. 8, 2016, 8 pages.
Supplementary European Search Report for application No. EP13829390; dated Mar. 2, 2016, 2 pages.
International Written Opinion for International Application No. PCT/CA2015/051369; International Filing Date: Dec. 23, 2015; dated Mar. 8, 2016; 4 pgs.

"Interoperability and Integration of Dismounted Soldier System Weapon Systems Update"; Mr. Mark Richter; Chairman; SCI-178 RTG-043; May 21, 2008, 38 Pages.
"Interoperability and Integration of Dismounted Soldier System Weapon Systems"; Major Bruce Gilchrist on behalf of Mr. Mark Richter; SCI-178 RTG-043; May 20, 2009.
"NATO Small Arms Weapons Research & Technology Study"; Per G. Arvidsson; Team Leader Technical Interfaces; NATO RTO Study SCI-178/RTG-043, 13 Pages.
"Powered Rail"; Presentation to Intl Infantry & Joint Service Small Arms System Symposium; May 20, 2009; Torbjoern Eld, Chairman; Powered rail team; NATO SCI-178 / RTG-043, 9 Pages.
CA Examination report for Application No. 2014331482, dated Mar. 22, 2017, 4 pages.
European Search Report for Application No. 15878323, dated Aug. 9, 2018, 3 pages.
European Search Report for Application No. EP 14 84 1869; dated Aug. 22, 2017.
European Search Report for Application No. EP 14 85 1134; dated Aug. 23, 2017, 3 pages.
European Search Report for Application No. EP 14 88 9015; dated Aug. 23, 2017.
European Search Report for Application No. EP 16 19 5258, dated Mar. 29, 2017, 4 pages.
European Written Opinion for Application No. 16162291.5; dated Jun. 22, 2016; 3 pgs.
Extended European Search Report for EP Application No. 16162291.5; dated Jun. 22, 2016.
Hoffman, Mike, "DARPA Develops Infantry Helmet Heads Up Displau", Kit Up!, dated Oct. 5, 2017, 9 pages.
International Search Report and Written Opinion for International Application No. PCT/CA2016/050591; dated Jul. 21, 2016.
International Search Report for International Application No. PCT/CA2016/050591; International Filing Date: May 26, 2016; dated Jul. 21, 2016; 4 pgs.
Supplementary European Search Report for Application No. 15878323.3-1206, dated Aug. 9, 2018 3 pages.
Supplementary European Search Report for Application No. 16798995, dated Nov. 30, 2018, 3 pages.
Written Opinion for Application No. EP 14 85 1134; dated Aug. 23, 2017, 4 pages.
Written Opinion for Application No. EP 14 88 9015; dated Aug. 23, 2017.
Written Opinion for EP Application No. 15878323.3, dated Aug. 9, 2018, 8 pages.
Written Opinion for International Application No. PCT/CA2016/050591; International Filing Date: May 26, 2016; dated Jul. 21, 2016; 6pgs.
Written Opinion of Application No. 16798995.3, dated Nov. 30, 2018, 6 pages.

* cited by examiner

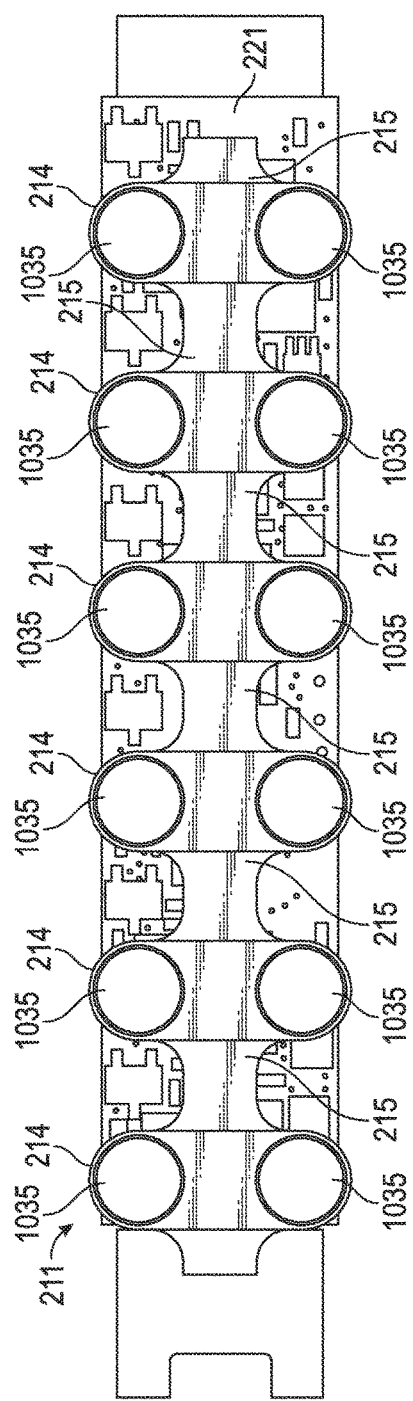
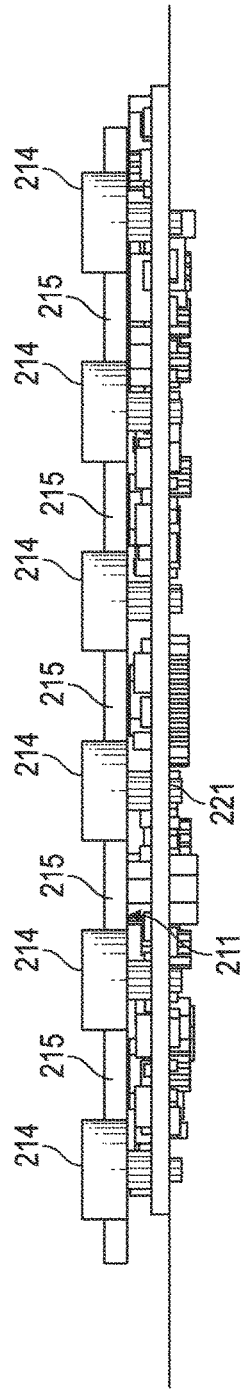
FIG. 41B
FIG. 41C

NETWORKED BATTLE SYSTEM OR FIREARM

CROSS REFERENCE TO RELATED APPLICATIONS

This application claims the benefit of U.S. Provisional Patent Application No. 61/976,157, filed Apr. 7, 2014; U.S. Provisional Patent Application No. 61/875,468, filed Sep. 9, 2013; and U.S. Provisional Patent Application No. 62/003,006, filed May 26, 2014, the contents each of which are incorporated herein by reference thereto. Reference is also made to U.S. patent application Ser. No. 13/968,882 filed Aug. 16, 2013, which claims the benefit of U.S. Provisional Patent Application Ser. No. 61/684,062, filed Aug. 16, 2012, the contents each of which are incorporated herein by reference thereto.

Reference is also made to U.S. patent application Ser. No. 13/956,582 filed Aug. 1, 2013, which claims the benefit of U.S. Provisional Patent Application Ser. No. 61/684,062, filed Aug. 16, 2012, the contents each of which is incorporated herein by reference thereto.

Reference is also made to the following applications, U.S. patent application Ser. No. 12/688,256 filed Jan. 15, 2010; U.S. patent application Ser. No. 13/372,825 filed Feb. 14, 2012; U.S. Provisional Patent Application Ser. No. 61/443,085 filed Feb. 15, 2011; and U.S. Provisional Patent Application Ser. No. 61/528,728 filed Aug. 29, 2011, the contents each of which are also incorporated herein by reference thereto.

BACKGROUND

Embodiments of the invention relate generally to systems and method of providing information between one or more different battlefield participants.

Communication of information between different battlefield participants (e.g., soldiers) may improve battle results. Further, the more information communicated, the more the improvement.

During battle several different components may be used. These include, for example, rifles, scopes, grenade launchers and communication devices. Some of these components may provide for different views and angles of attack in a battlefield situation.

SUMMARY OF THE INVENTION

In one exemplary embodiment, a weapon is disclosed that provides information regarding its position and orientation to a central location that can interpret and display this information.

In one embodiment, a networked battle system includes a communication network, a first rifle that includes at least one accessory coupled thereto that determines a bearing of the first rifle and a communication element allowing the at least one accessory to provide bearing information to the communication network. The system also includes a battle management system in communication with the first rifle through the communication network that receives the bearing information from the accessory and updates a battle plan based on the bearing information to form an updated battle plan.

In another embodiment a networked battle system includes a communication network, a battlefield device that includes at least one accessory coupled thereto that determines a location of the first battlefield and a display device, and a distance determining device separate from the first battlefield device, the distance determining providing a distance from it to a target and a location of the distance determining device to the communication network. The system also includes a battle management system in communication with the first battlefield device and the distance determining element through the communication network that receives the distance determining device location and the distance to the target and updates a battle plan based the information from the distance determining device to form an updated battle plan.

In another embodiment, an indirect firing system includes a firearm having a communication system, an inclinometer that measures an inclination of the firearm, a roll sensor that measures the roll angle of the firearm, and a bearing sensor that measures a bearing of a projectile that the firearm launches. The system also includes a computing device in communication with the communication system, the computing device, in operation, receiving bearing, roll and inclination information for the firearm from the communication system and displaying a map in a region near the firearm and a projected impact location of the projectile based on the bearing, roll and inclination information.

Other aspects and features of embodiments of the invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 11A and 11B-14 illustrate the pins of an accessory and how that accessory may be coupled to a rail;

FIG. 40 illustrates a bottom view of the powered rail illustrated in

FIG. 38;

FIGS. 41A-41C illustrate an insert configured for use with the plurality of contacts of the powered rail.

DETAILED DESCRIPTION

The term "firearm" as used herein, refers at least to a rifle, machine gun, weapon, and pistol and may be automatic, semi-automatic or otherwise. Another example of a firearm includes a grenade launcher, mortar launcher or the like. A power or non-powered rail on a firearm may have certain accessories attached to it. The accessories include, for example, telescopic sights, tactical sights, laser sighting modules, Global Positioning Systems (GPS), bearing sensors, inclination sensors, laser distance measuring devices, accelerometers and night vision scopes. This list is not meant to be exclusive, merely an example of accessories that may utilize a rail.

Figure 1:
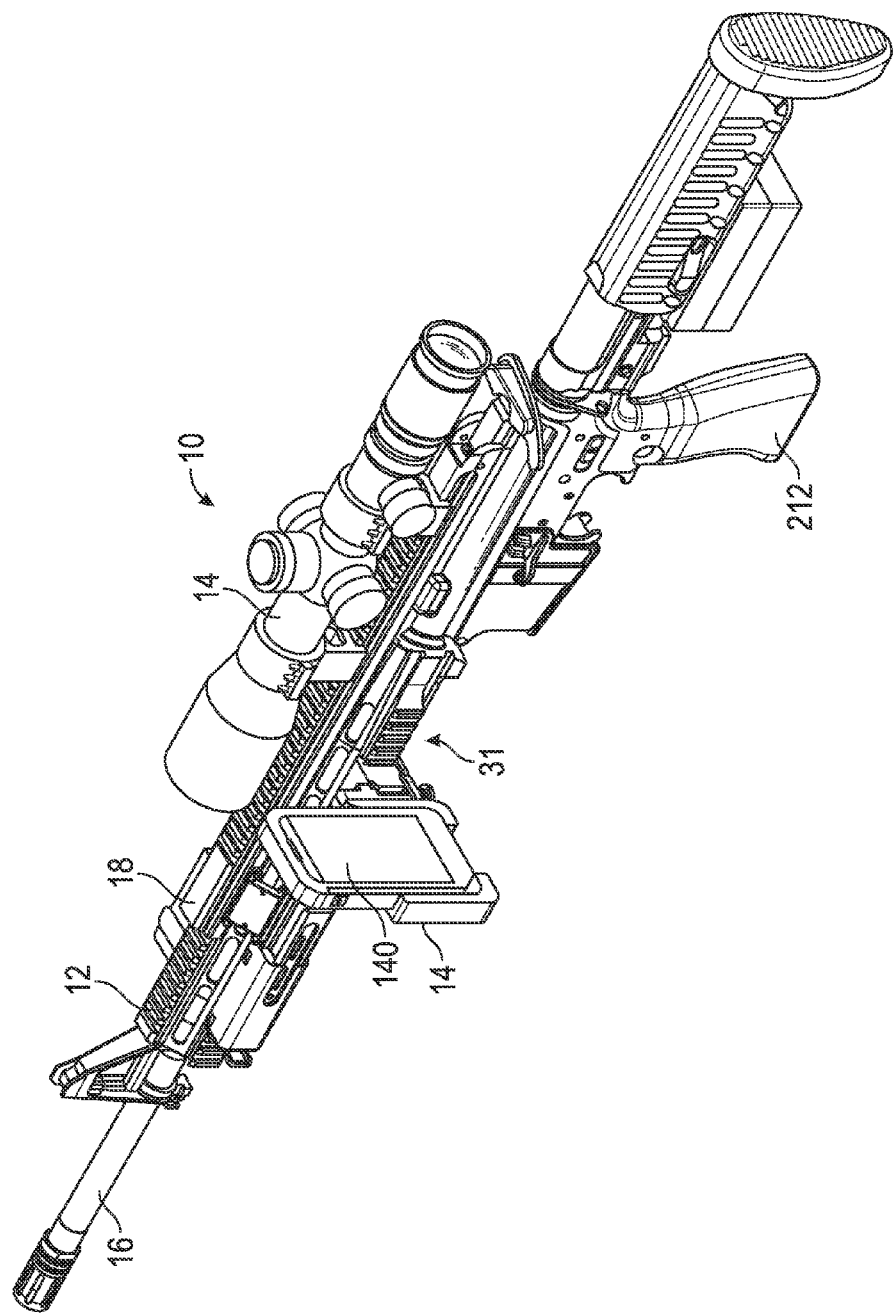
FIG. 1 is a perspective view of firearm embodied as a rifle according to one embodiment.

Referring now to FIG. 1, a perspective view of a rifle, weapon, firearm, (automatic, semi-automatic or otherwise) 10 is illustrated. Rifle, weapon, firearm, etc. 10 has a plurality of rails 12. In one embodiment, rails 12 may be anyone of a MIL-STD-1913 rail, Weaver rail, NATO STANAG 4694 accessory rail or equivalents thereof. Rails 12 are configured to allow a plurality of accessories 14 to the rifle 10. Rails 12 are mounted at the 12 o'clock, 3 o'clock, 6 o'clock and 9 o'clock positions with respect to a longitudinal or firing axis of the rifle and/or a barrel 16 of the rifle 10.

Accessories 14 may be any one of telescopic sights, tactical sights, laser sighting modules, Global Positioning Systems (GPS) and night vision scopes or any type of sensor. The aforementioned accessories are merely an example of contemplated accessories for use with rifle or firearm 10. A specific example of an attached accessory is shown as personal data assistant (PDA) 140 or cellular telephone in FIG. 1. In accordance with an exemplary embodiment, accessories 14 are items that require a source of power and/or require data communication with another component of the rifle or firearm 10 or a system in which rifle or firearm 10 is employed. Of course, one or more the accessories may have its own power supply and may be able to communicate data independent of the firearm.

A portion of a powering rail configured as a MIL-STD-1913 rail is shown generally as 12. Rail 12 is a MIL-STD-1913 rail, such as a Weaver rail, NATO STANAG 4694 accessory rail or the like. Sliding over rail 12 is a powered or powering rail 18.

Figure 2:
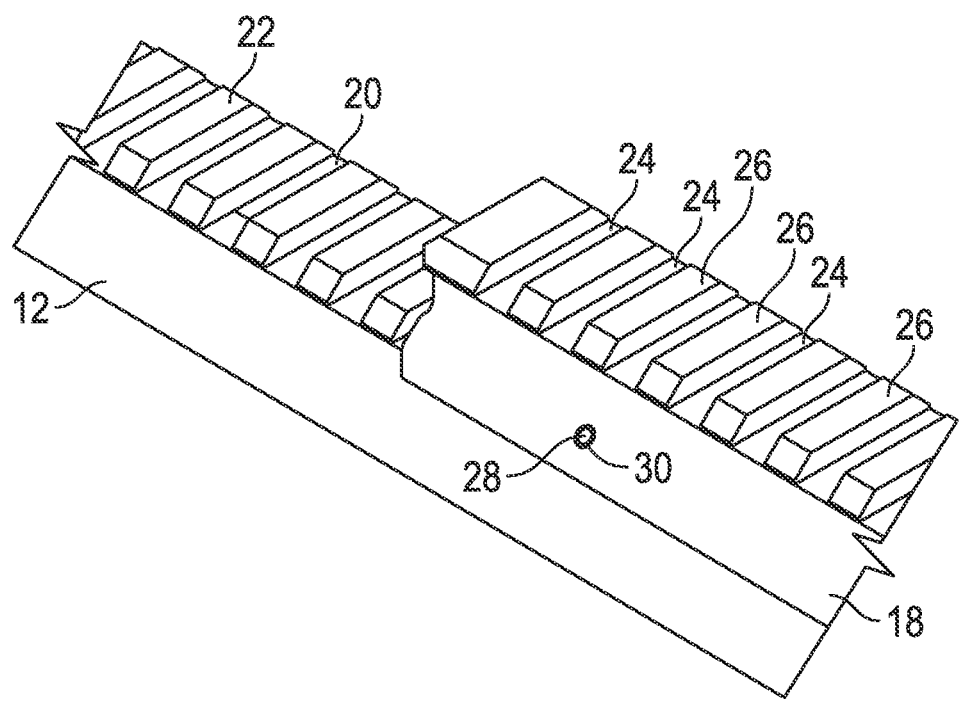
FIG. 2 shows an example of a rail configuration according to one embodiment.

With reference to FIG. 2, rail 12 has a plurality of rail slots 20 and rail ribs 22, which are utilized in receiving an accessory of another rail such as powering rail 18. Powering rail 18 comprises a plurality of rail slots 24 and rail ribs 26 in a configuration that allows for the mating of accessories with powering rail 18.

In one embodiment, powering rail 18 is mounted to rail 12 via a cross pin 28 or other device received within a pin hole 30 of powering rail 18. The pin hole 30 accepts the cross pin 28 so that the pin 28 locks and secures the rails 12 and 18 together. Although FIG. 1 illustrates rail 18 secured to a top rail 12 of an upper receiver 31 of rifle or firearm 10 rail 18 can also be secured in additional locations such as the 3, 6 and 9 o'clock rail 12 locations. Still further, rail 18 may be secured to anyone or any combination of the 3, 6 and 9 o'clock rail 12 locations. In addition and in one alternative embodiment, powering rail 18 may be formed into anyone of rails 12 such that a separate rail 18 is not necessary. In other words and in this embodiment, the rail 12 is now the networked power and/or data transmitting rail.

As discussed further below, the rail 18 may also provide a path for transferring data from any or all of the accessories 14 to one or more processors carried in the firearm 10. Such processors may be located, for example, in the rail 18 or the pistol grip 212 or both.

Figure 3:
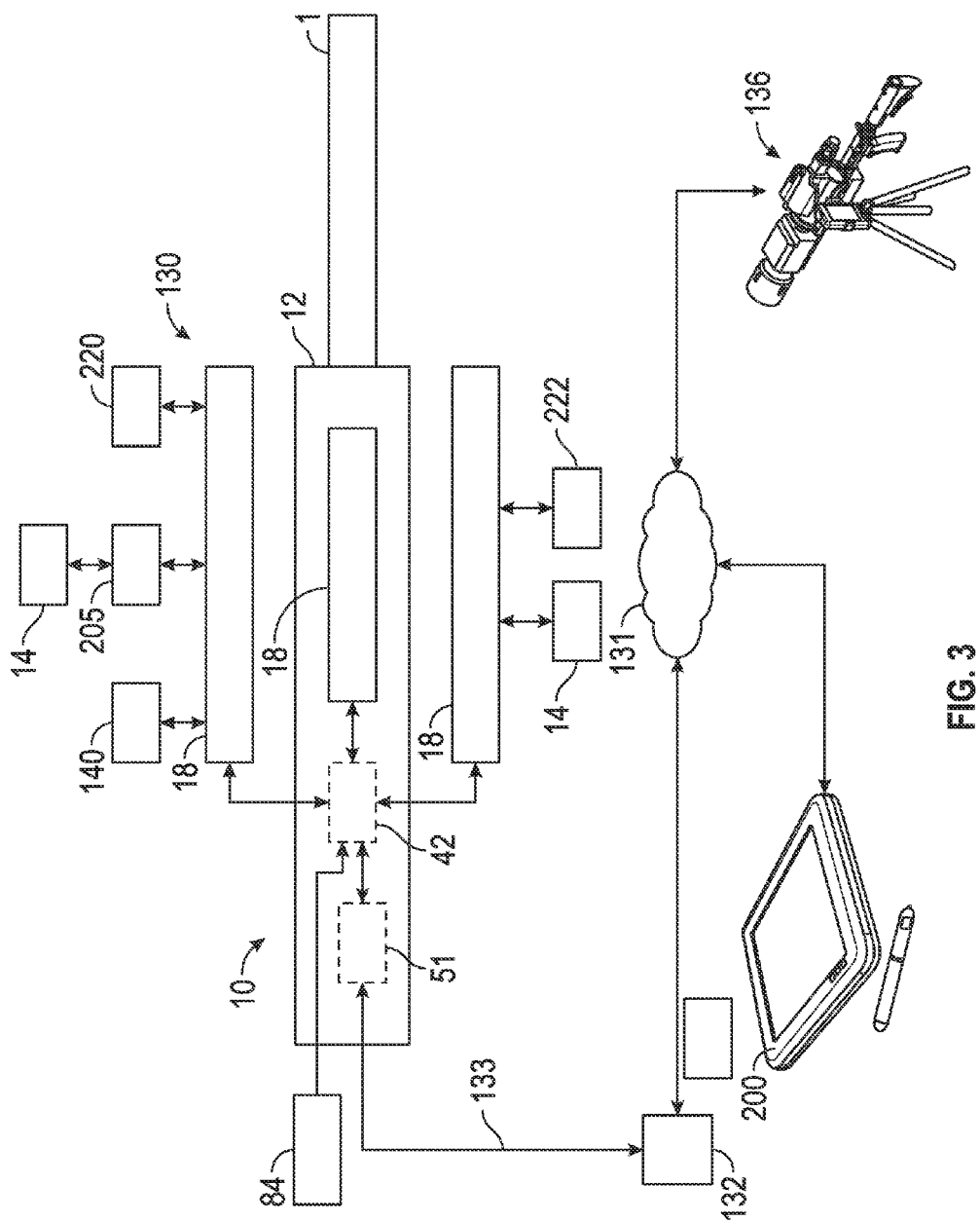
FIG. 3 is high-level system diagram illustrating a network formed between a firearm and another device.

Referring now to FIG. 3, a schematic illustration of a system 130, using various embodiments of the present invention is illustrated. As illustrated, a firearm 10 includes a barrel 1 and has a plurality of powering rails 18 (e.g., 3 o'clock, 6 o'clock, 9 o'clock and 12 o'clock locations with respect to a longitudinal axis of the firearm 10 are provided, of course, any other locations are also contemplated). The powering rails 18 are attached, in one embodiment, to rail 12.

Each of the powering rails 18 are configured to transmit power to an associated accessory 14 via conductive couplings. The same or different couplings may also allow for the transmission of data though the rails 18 to/from the accessories. The couplings can be any type of coupling including, for example, inductive couplings and/or galvanic couplings including direct contact between two conductive materials. In one embodiment, one of data or power is transmitted via inductive couplings and the other of data or power is transmitted via galvanic couplings. More detailed description of the powering rails 18 and the manner in which power/data may be transferred is described in one or more the patents/patent applications mentioned above.

Each of the rails 18 are also configured to communicate with a rail master control unit or processor 42 via a data bus, which in turn allows all of the accessories 14 to communicate information to other processors in the firearm. For example, the firearm 10 may further include a processor 51 disposed in the grip 212 (FIG. 1) of the firearm. As discussed more fully below, the processor 51 may serve as the master control unit. In one embodiment, the processor 42 may be omitted.

To the extent that the processor 42 is included, it may be referred to as a bus processor herein and it controls access to the data bus formed by the powering rails to allow for the processor 51 to communicate information to and from the accessories 14. The bus processor 42 may be located in either the upper or lower receiver of the firearm 10 or may be disposed in/on rails 12 or power rails 18.

As illustrated, processor 51 is coupled via communication link 133 to a communication device 132 that may be worn, for example, in backpack or vest. This allows for the processor 51 to communicate with other devices 136/200 in the system as more fully described below. The communication link 133 may be wired or wireless or a combination thereof. The communication device 132 may communicate in any known manner including, but not limited to, rf communications, cellular communications, Bluetooth, and ZigBee and the communication path is generally shown as passing through a communication network 131. The communication network 131 can be any type of now known or later created network and may include one or more additional processors for routing or storing the information.

In one non-limiting embodiment the observer system 136 is illustrated as a spotter scope 136 that may be able to determine the location of a potential target. This may include determining the location of the scope 136 and the distance/direction to the target for instance, by combining a GPS location of the scope 136 with distance from a laser range finder and means for determining pointing direction as discussed below this information may then be transferred form the scope 136 to the firearm 10 and then routed through the rails and a location of the target displayed on a map shown on an accessory 14 such as a PDA. In this embodiment, firearm 10 of the system 130 is a sniper rifle, which is networked or communicates with observer system 136 through the communication network 131. In one embodiment, the communication between the firearm and the scope 136 (or the tablet 200 discussed below) may be direct point-to-point contact. It shall be understood that one or more of the accessories 14 may also communicate directly to the communication network 131 in any known manner including, but not limited to, rf communications, cellular communications, Bluetooth, and ZigBee and these communication devices may be any one of accessories 14 or peripheral device 132 which may be worn by an operator of one of the components. In one embodiment, the communication network is a wireless LAN network. The communication devices also being networked or in communication with other devices coupled to the powered rail(s) 18. Although only two items (e.g., firearm 10 and observer system 136) are illustrated it is understood that numerous items (e.g., more than two) may be networked to communicate with each other. For example, multiple firearms 10, observer systems 136 and numerous other devices or items may be networked through system 130 and data can be exchanged between any of the items through the communication network 131. Each item may target, identify, or exchange data (either unique to that item or common between items) with respect to multiple targets, locations, persons, or other items.

Figure 37:
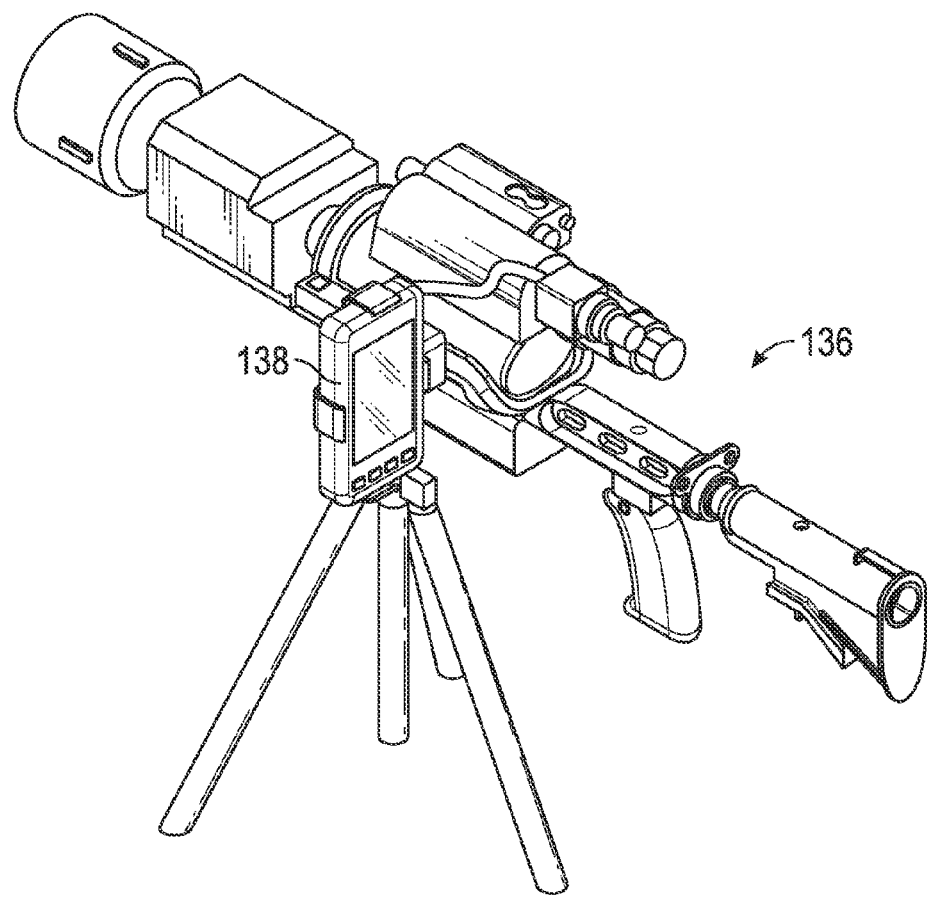
FIG. 37 illustrates a component of the network powered system illustrated in at least FIGS. 5 and 36.
Figure 38:
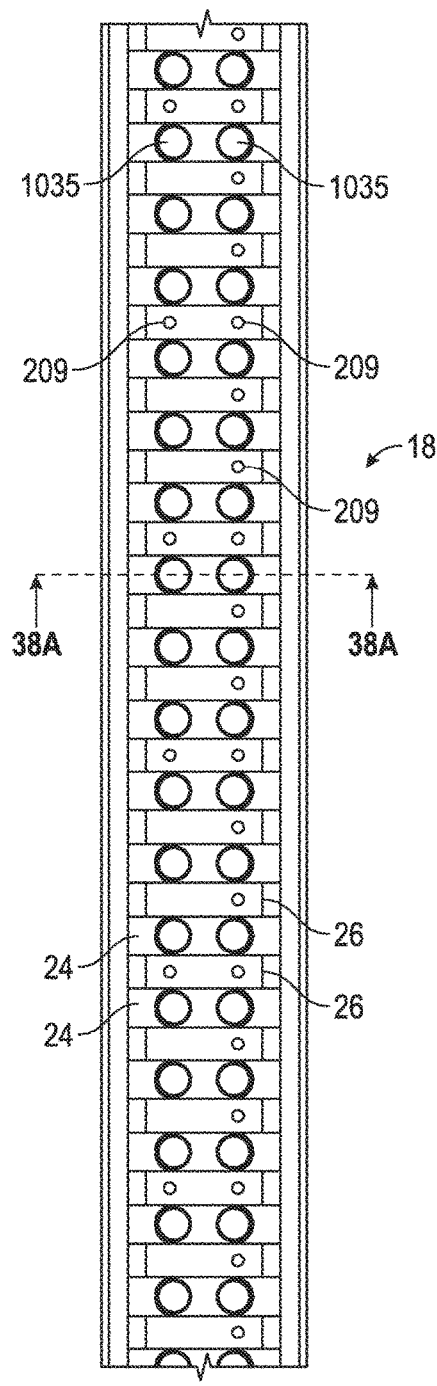
FIG. 38 illustrates a top plan view of a powered rail.
Figure 38A:
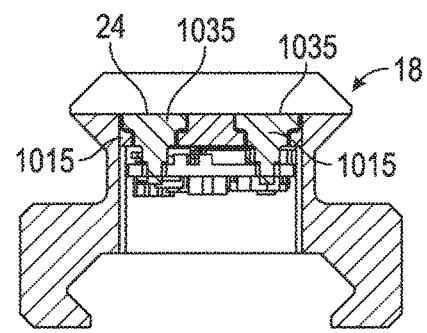
FIG. 38A is a view along lines 38A-38C of FIG. 38.
Figure 38B:
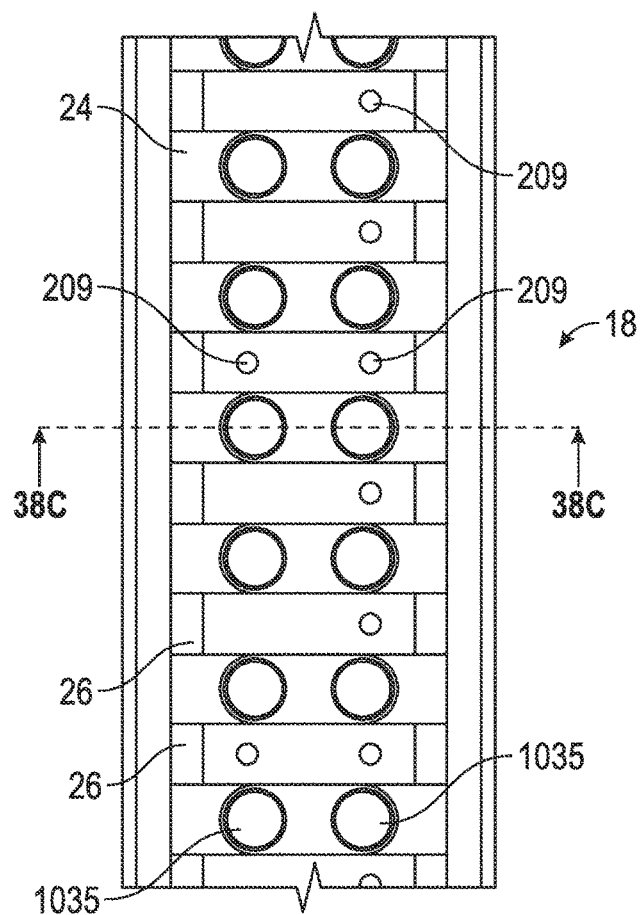
Figure 38C:
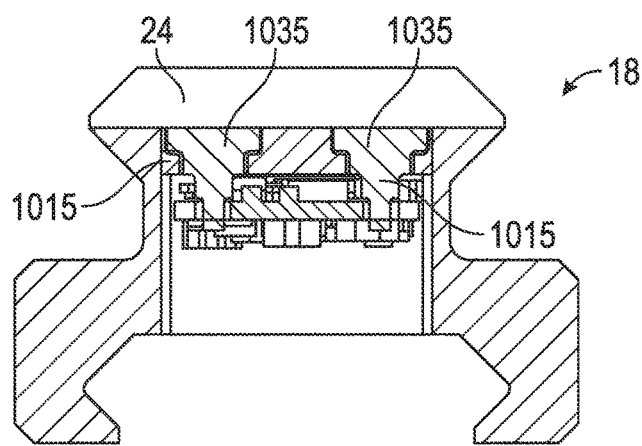

Another example of a scope 138 is shown in FIG. 37. In this embodiment, the spotter system 136 may have a device 138 that communicates with an associated accessory 14 or device 140 illustrated in at least FIG. 1. For example, devices 138 and 140 may be GPS, laser range finder, PDA or targeting devices capable of communicating (e.g., wireless or otherwise) with each other and thus exchanging data and information.

The system illustrated in FIG. 3 shows a version of the system 130 capable of communication with and/or part of a battlefield management system (BMS) illustrated as tablet computer 200. Of course, the BMS could be implanted on other types of devices. Further, it shall be understood that the PDA 140 could be part of the system. In general, a battlefield management system is a system that integrates information acquired from multiple inputs and can be used coordinate movement/actions of multiple actors (e.g., soldiers).

Figure 20A:
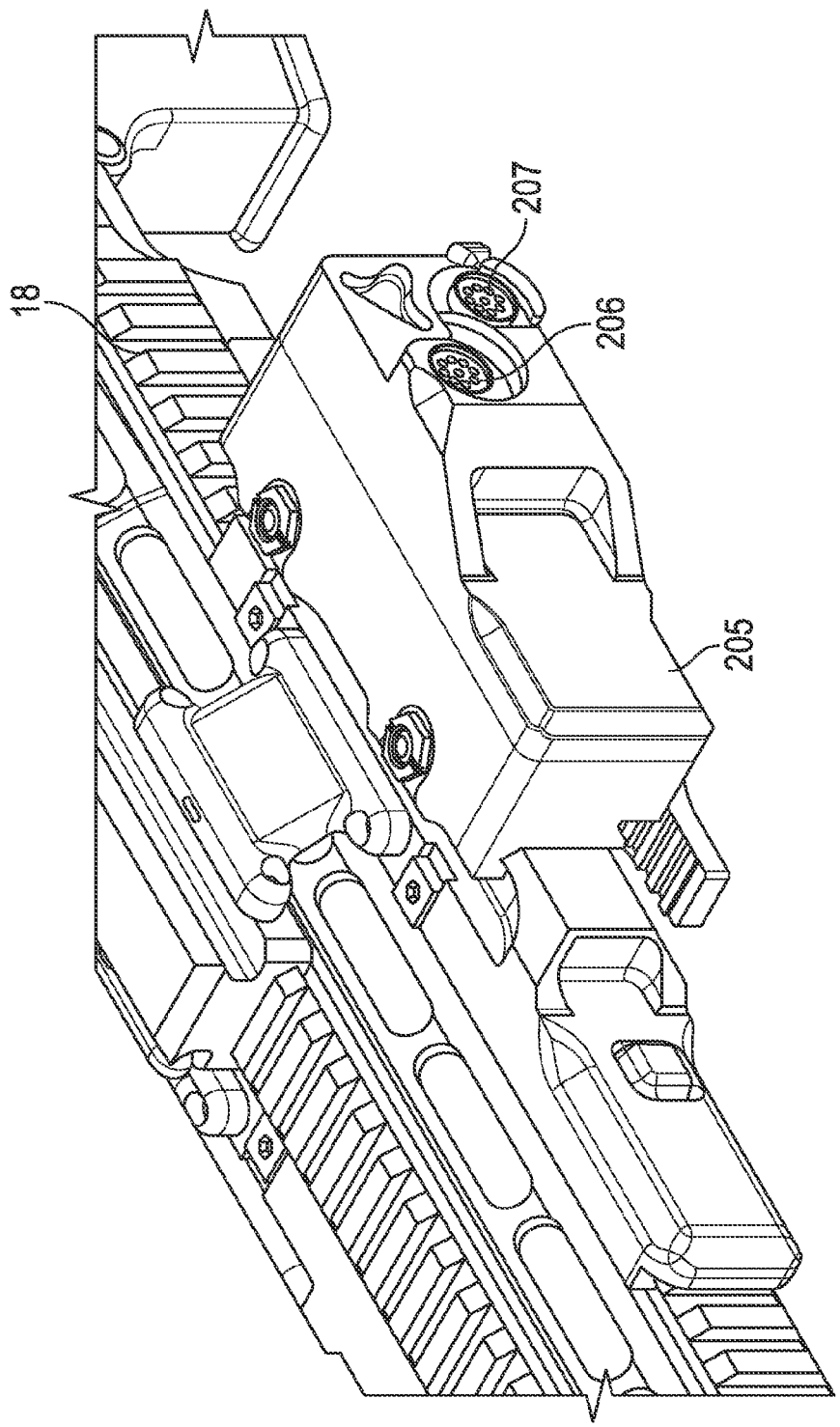
FIGS. 20A-20B show an example of an adapter that may be connected between an accessory and a rail.
Figure 20B:
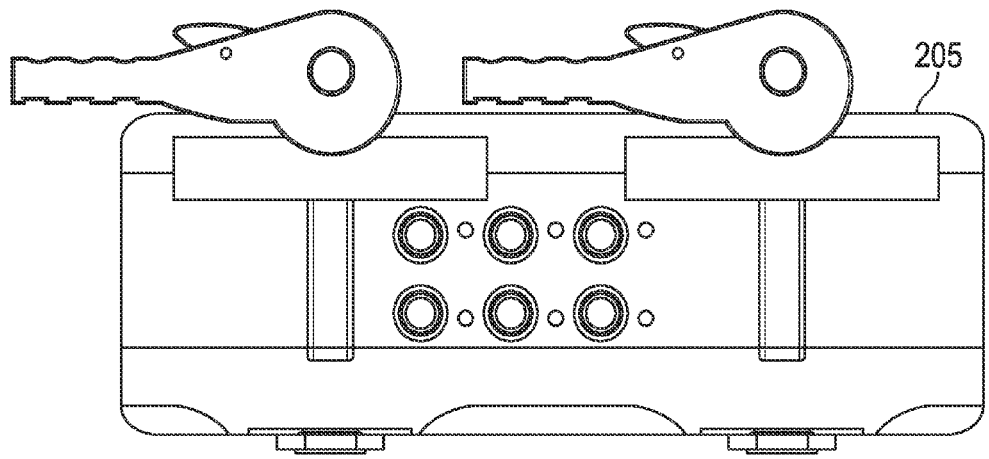

As illustrated, one of the accessories 14 is coupled to an adapter 205 that allows it to communicate with the rail. The adapter 205 could condition power into a form desired by the accessory. For example, the adapter could be utilized to convert power into a form or particular pin layout used by a PDA or scope. Further, the adapter could include formatting logic to convert PDA or scope data into a form conductive for transmission through the rail 18. For example, parallel data could be converted into serial format. FIG. 20 shows an example of an adapter 205 mounted to rail 18. The illustrated adapter 205 includes two peripheral ports 206, 207 that can be used, for example, to connect to a PDA and a scope. Of course, the ports could connect to other devices such as cameras (still or video) or any other device.

In one embodiment, the system 130 includes a sensor 220 capable of determining a bearing of firearm 10. Such a sensor may be a compass or part of a GPS device or other device. In one embodiment, the angular (bearing, pitch and roll) information may be determined from sensors contained in PDA 140. In other embodiments, the angular sensors may be formed by one or more rotationally sensitive sensors such as inclinometers, rate gyros, accelerometers and magnometer mounted on the firearm 10. In one embodiment the firearm 10 includes at least one set of angular sensors 222 to determine the inclination, roll and bearing with respect to the horizontal axis of the firearm. The processor 51 may combine the data from the sensors (e.g., 220, 222) as well as information from another other accessory 14 on the firearm and then cause it to be transmitted via communication device 132 to the battle management system 200 or any other observer system 136. It shall be understood that any of the capabilities disclosed herein with respect to the rifle 10 may be applicable to the scope 136 or any other device included in system 130.

In one embodiment, the processor 51 collects data from the accessories 14 (herein, accessories will also include any sensor on the firearm) in either a polled or interrupt method via the data bus. The data bus can be either wired or wireless interfaces. The processor 51 may utilize a real time clock to routinely interrogate accessories 14 at a predetermined schedule. During these predetermined intervals the processor 51 reads the data and stores it into memory. In one embodiment, the data is tagged with a real time clock stamp to facilitate data processing. In one embodiment, one or more of the accessories 14 are interrupt driven. In such a case, an event causes the accessory 14 to send an interrupt to the processor 51 which, in turn, causes the processor 51 to collect data from the accessory 14.

Regardless of how collected, the data is transmitted from communication device 132 to the tablet 200, the observer system 136 or both. Further, either of observer 136 or the tablet 200 can send information back to the firearm 10.

In operation, processor 51 draws power from the power supply 84 and may discover connected accessories 14. In one embodiment, the discovery may include verifying that the accessory 14 is operable. In the case that the accessory 14 is a sensor, the processor 51 may configure the sensor based on its location on the firearm and function. The sensors can be navigation, acoustic or optical devices. The sensors all communicate to the processor via the data bus and report sensor data and status. The navigation sensors could be individual or integrated into a single package, and are GPS (military or commercial), accelerometer, rate gyro, magnometer (compass) or gyro scope and may sense and report in all three axial planes (x, y & z). The acoustic sensor may provide an acoustic signature of the environment around the firearm as well as of the firearm itself. The optical sensor may capture the optical spectrum in front of the weapon. The optical spectrum could be the visual, infrared, thermal, Short Wave Length, Medium Wave Length and Long Wave Length, etc.

It shall be understood that the format of the data stored/transmitted by the processor 51 can be varied and adapted to meet any preferred receiving performance. Further, while there are several different accessories 14 disclosed above, it shall be understood that the processor 51 may include the ability to synthesize the data from these accessories before transmitting the data. For example, if a camera is used to form a digital image of a target, the time and the position and orientation of the rifle 10 can be attached to that image before it is transmitted. Further, in some cases, the rifle 10 may include a video camera attached as an accessory. In such a case, the data (e.g., images) could be streamed in real-time with time/position data appended thereto or sent in periodic or interrupt driven intervals.

In some cases, the processor 51 may include the ability to process the data collected from the accessories 14. For example, the processor 51 may include instructions that allow it perform ballistics calculations, target range and angular offset calculation, and target tracking. Further, based on collected data, the number of shots taken, remaining ammunition, firearm performance and maintenance determinations and other firearm related calculations may be made. In one embodiment, the accessories 14/processor 51 monitor the internal ballistic life cycle and internal mechanisms of the firearm. As a firearm's mechanisms wear or become fouled, previously recorded events can be compared to determine the percentage of difference. Dependent on the parameter be monitored, such comparisons may determine the usefulness of the firearm.

Either in real time or at a prior time, map information related to an area in which the firearm 10 is, or in the future may be, located is provided to one or more of: microprocessor 84, PDA 140, and tablet 200. The map information may be in the form of an overhead aerial view in one embodiment and may be received from any source including, but not limited to reconnaissance information taken by satellite or other overhead device such as a drone. Of course, publicly available maps could be used in one embodiment. Based on a GPS location of the firearm 10, a portion of the map may be selected. Given the bearing of the firearm 10, a view of the map in the region in front of the firearm 10 may be selected and displayed on the PDA 140. Further, with the information the location of "friendlies" can be displayed on the maps as the table 200 includes information from all of the weapons in the system 130 and can place indicators on the map at those locations. Further, as an example, the location of a hostile party may be added to the map based, for example, the location of a friendly and a distance measured to the hostile by a laser range finder.

In one embodiment, the firearm 10 includes an inclinometer as one of the accessories 14. Assuming that ballistic information is known about a projectile (e.g., a bullet or grenade) that the firearm 10 (or an attachment thereto) fires, a projected impact point on the map be displayed.

Figure 4:
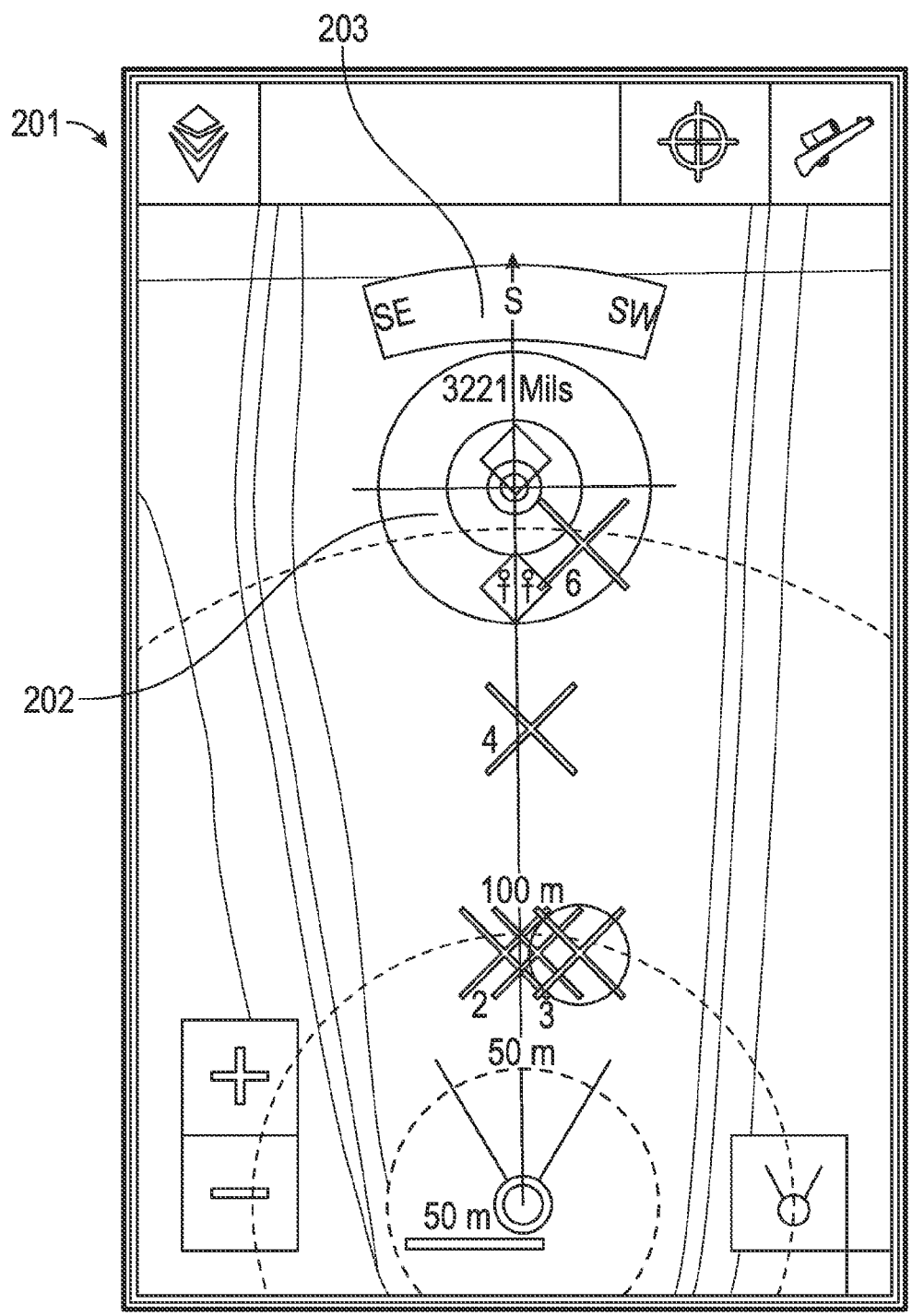
FIG. 4 is an example of display screen of an accessory that may be coupled to a firearm.

With reference to FIG. 4, an example of a display 201 of PDA 140 is illustrated. The bearing information (shown by compass 203) described above can be used to position a possible impact location 202 of the projectile in along the y axis. Similarly, information from an angular sensors and the ballistic information can be used to determine how far the projectile will travel and then, thus, determines the location of the impact location 202. As the firearm as raised upward, the impact location 202 translates up on the map 201.

Figure 5:
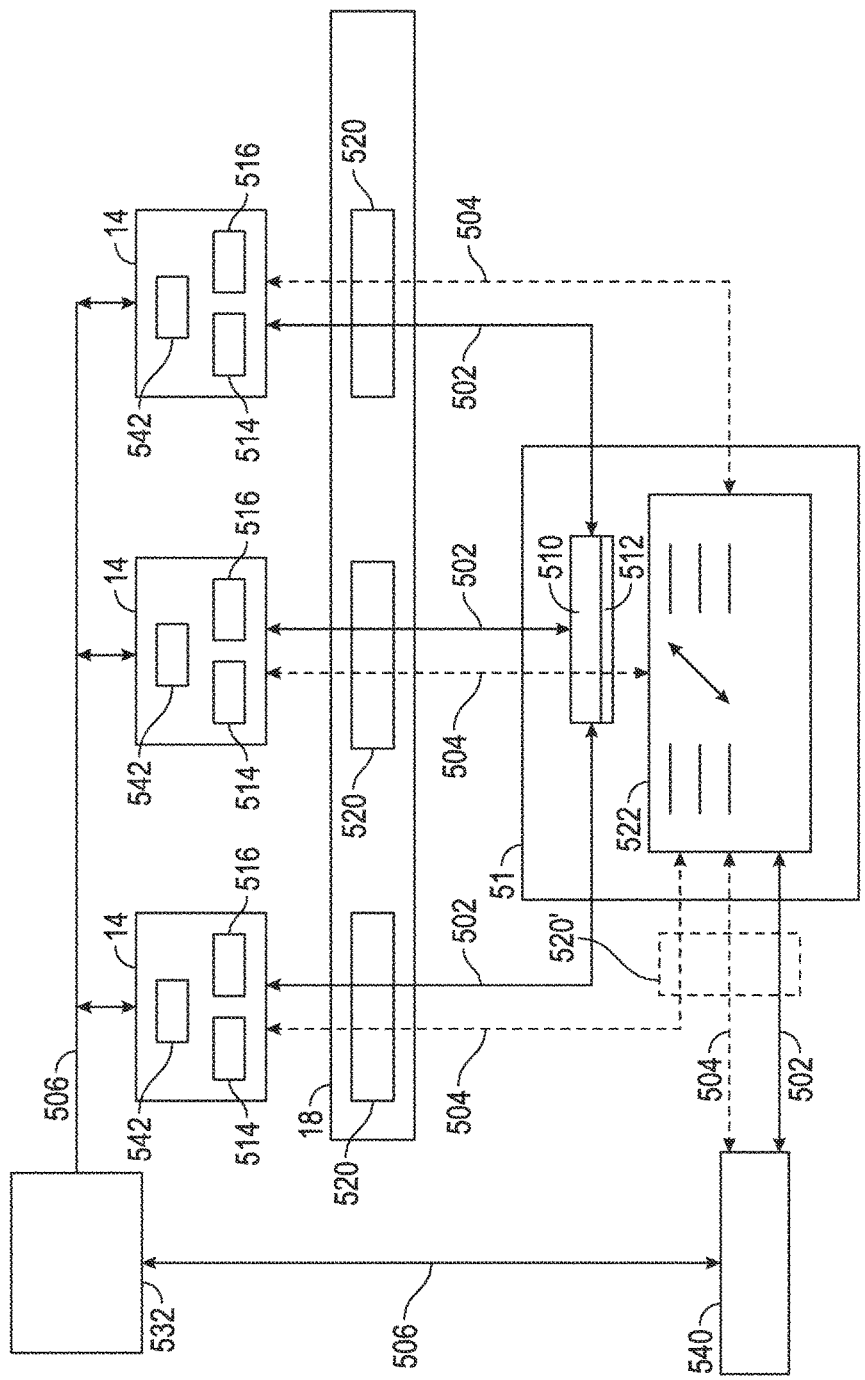
FIG. 5 is a diagram illustrating different possible communication paths in a firearm.

FIG. 5 schematically illustrates communication between various components on a firearm as disclosed herein. The firearm includes at least one rail 18 onto which several accessories 14 are coupled. The system includes three different communication channels shown as a low speed channel 502, a medium speed channel 504 and a high speed channel 506. The low speed channel 502 extends from and allows communication between the master processor 76 and any of the accessories 14. The low speed channel 502 can be driven by a low speed transmitter/receiver 510 in processor 51 that includes selection logic 512 for selecting which of the accessories 14 to route the communication to.

Each accessory 14 includes low speed decoding/encoding logic 514 to receive and decode information received over the low speed channel 502. Of course, the low speed decoding/encoding logic 514 can also include the ability to transmit information from the accessories 14 as described above.

In one embodiment, the low speed channel 502 carries data at or about 100 kB/s. Of course, other speeds could be used. The low speed channel 502 passes through a coupling 520. The coupling 520 could be galvanic or via inductive coil pairs. In one embodiment, the inductive coil pair could be replaced include a two or more core portions about which the coil pair is wound. In another embodiment, the cores can be omitted and the inductive coil pair can be implemented as an air core transformer. As illustrated, the couplings 520 are contained within the powering rail 18. Of course, one or more of the portions of the coupling can be displaced from the rail 18.

The medium speed channel 504 is connected to couplings 520 and shares them with low speed channel 502. For clarity, branches of the medium speed channel 504 as illustrated in dashed lines. As one of ordinary skill will realize, data can be transferred on both the low speed channel 502 and the medium speed channel at the same time. The medium speed channel 504 is used to transmit data between the accessories 14.

Both the low and medium speed channels 502, 504 can also be used to transmit data to or receive data from an accessory (e.g. a tether) not physically attached to the rail 18 as illustrated by element 540. The connection between the processor 51 can be either direct or through an optional inductive coil pair 520'. In one embodiment, the optional inductive coil pair 520' couples power or data or both to processor 51 which may be located in or near a handle portion (e.g., pistol grip) of a firearm.

To allow for communication between accessories 14 over the medium speed channel 504, the processor 51 can include routing logic 522 that couples signals from one accessory to another based on information either received on the medium speed channel 504. Of course, in the case where two accessories coupled to the rail 18 are communicating via the medium speed channel 502, the signal can be boosted or otherwise powered to ensure is can drive couplings 520 between the accessories.

In another example, the accessory that is transmitting the data first utilizes the low speed channel 502 to cause the processor 51 sets the routing logic 522 to couple the medium speed channel 504 to the desired receiving accessory. Of course, the processor 51 itself (or an element coupled to it) can be used to separate low and medium speed communications from one another and provide them to either the low speed transmitter/receiver 510 or the routing logic 522, respectively. In one embodiment, the medium speed channel 504 carries data at 10 MB/s.

FIG. 5 also illustrates a high speed channel 506. In one embodiment, the high speed channel 506 is formed by an optical data line and runs along at least a portion of the length of the rail 18. For clarity, however, the high speed channel 506 is illustrated separated from the rail 18. Accessories 14 can include optical transmitter/receivers 542 for providing signals to and receiving signals from the high speed channel 506. In one embodiment, a high speed signal controller 532 is provided to control data flow along the high speed channel 506. It shall be understood that the high speed signal controller 532 can be located in any location and may be provided, for example, as part of the processor 51. In one embodiment, the high speed signal controller 532 is an optical signal controller such as, for example, an optical router.

Figure 6:
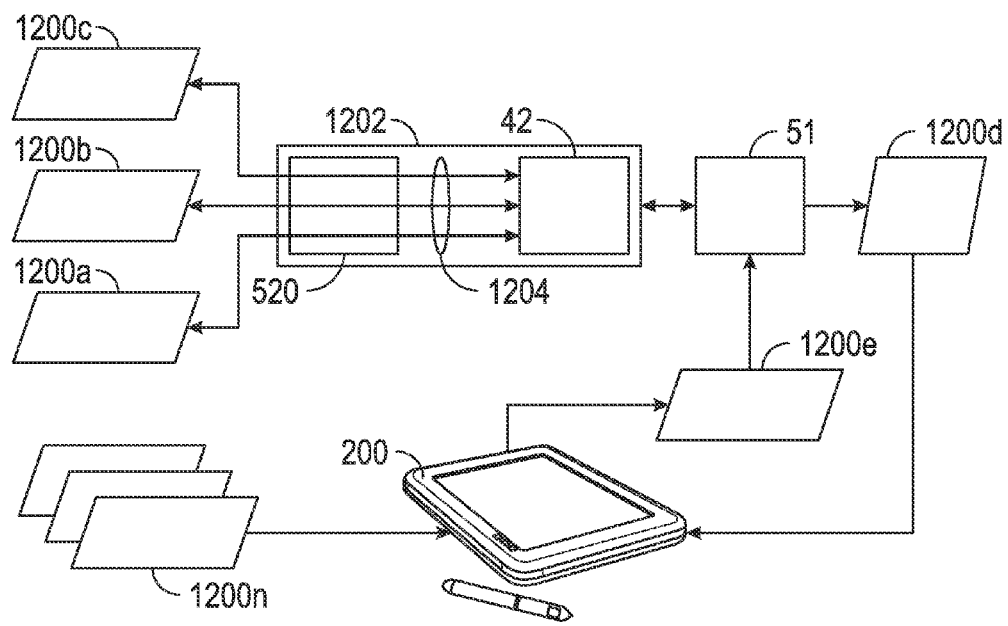
FIG. 6 is a dataflow diagram illustrating data transfer from rifle accessories to a central location and back.

FIG. 6 shows a dataflow of information as it may be transferred according to one embodiment. Accessory data 1200*a*, 1200*b* and 1200*c* is representative of data that may be transferred to or from accessories coupled to a rail system 1202 coupled to a firearm. The rail system 1202 may be formed as herein described. Of course other rail systems capable of supporting one or more accessories on a firearm may be utilized. The rail system 1202 may provide power to the accessories in one embodiment but that is not required. The rail system 18 may also provide a physical conduit for transmitting data to and from the accessories. As mentioned above and as more fully discussed below, the data 1200*a*-1200*c* passes through a coupling 520 that provides for inductive or galvanic transfer of the data from the accessory to the communication pathway (e.g., bus) 1204 provided by the rail system 1202. Of course, other energy transfer methods such as capacitive coupling may be utlilized. Processor 42 controls communication over the bus 1204 and as such may be referred to as a bus processor in one embodiment. The bus processor 42 may be located in the rail system 1202 itself or in the upper or lower receiver of a firearm. The bus processor may be above to determine, in one embodiment, when an accessory is coupled to the rail system 1202. It should be noted that another processor (e.g. processor 51) may perform the bus control functions in one embodiment and, in such and embodiment, the bus processor 42 may be omitted.

The bus processor can allow, for example, for first accessory data 1200*a* to be transferred to the processor 51 first, followed by data 1200*b* and then 1200*c* in one embodiment. Of course, any ordering a data can be provided for. The data reaches processor 51 and then transformed into an output data set 1200*d*. In one embodiment, the output data set is a compilation of portions of the data 1200*a*-*c*. Output data set 1200*d* could also include additional information such as a time stamp. For example, assume data 1200*a* is GPS data from a GPS device coupled to the rail system 1200, data 1200*b* is bearing information and data 1200*c* is a target distance value. This data could be combined and time stamped to provide an accurate time sensitive location of a potential target. Data 1200*d* may also include manipulated data as well. Regardless, data 1200*d* is provided to computing device 200 (e.g., a battle management system).

Computing device 200 may also receive data from other battlefield devices (e.g., other rail systems) as generally indicated by data 1200*n*. The computing device takes some or all of the data that it has received and may, in one embodiment create mission data 1200*e*. This data is then transferred to processor 51 and subsequently provided to one or more of the accessories. An example (following from above) includes mission data 1200*e* that includes a map showing all of the targets identified by any of the rifles and data 1200*e* could be sent to any or all of the rifles that are connected to a particular network. The format and content of the each of the different data elements shown in FIG. 6 may be platform agnostic in one embodiment so that the system 1202 may integrated into any preexisting or later developed battle management system.

Figure 7:
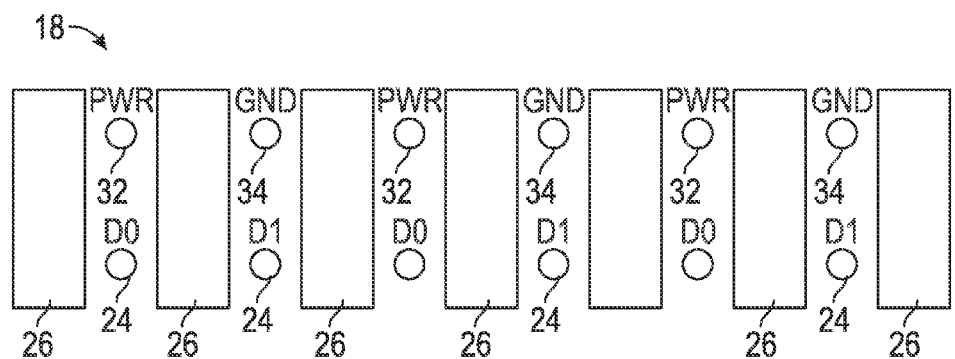
FIG. 7 shows one configuration of how power and data connections may be arranged rail according to one embodiment.

As referred to above, the rails 18 can be used to deliver power and/or data to the accessories 14. The power and/or data can be transferred bidirectionally to and from the rail to the accessory inductively or via a direct electrical (galvanic) connection. Referring now to FIG. 7, a rail pinout is shown for rail 18. The rail 18 includes the rail slot 24 disposed between each of the rail ribs 26. The rail slot 24 includes either a power contact 32 or a ground contact 34 and either a first data contact D0 or a second data contact D1. In one embodiment, the power contact 32 and ground contact 34 cannot be easily shorted together since they are in alternate slots 24 of powering rail 18. Also, if an accessory 14 is secured to the rail 18 in an incorrect fashion (e.g., backwards) no power/data will be provided as the accessory 14 will have a corresponding pattern configured to match the rail pin configuration as illustrated in FIG. 7. As illustrated in FIG. 7, two slots 24 are required at a minimum to connect an accessory 14 to power, ground, and data (D0 and D1).

Figure 8:
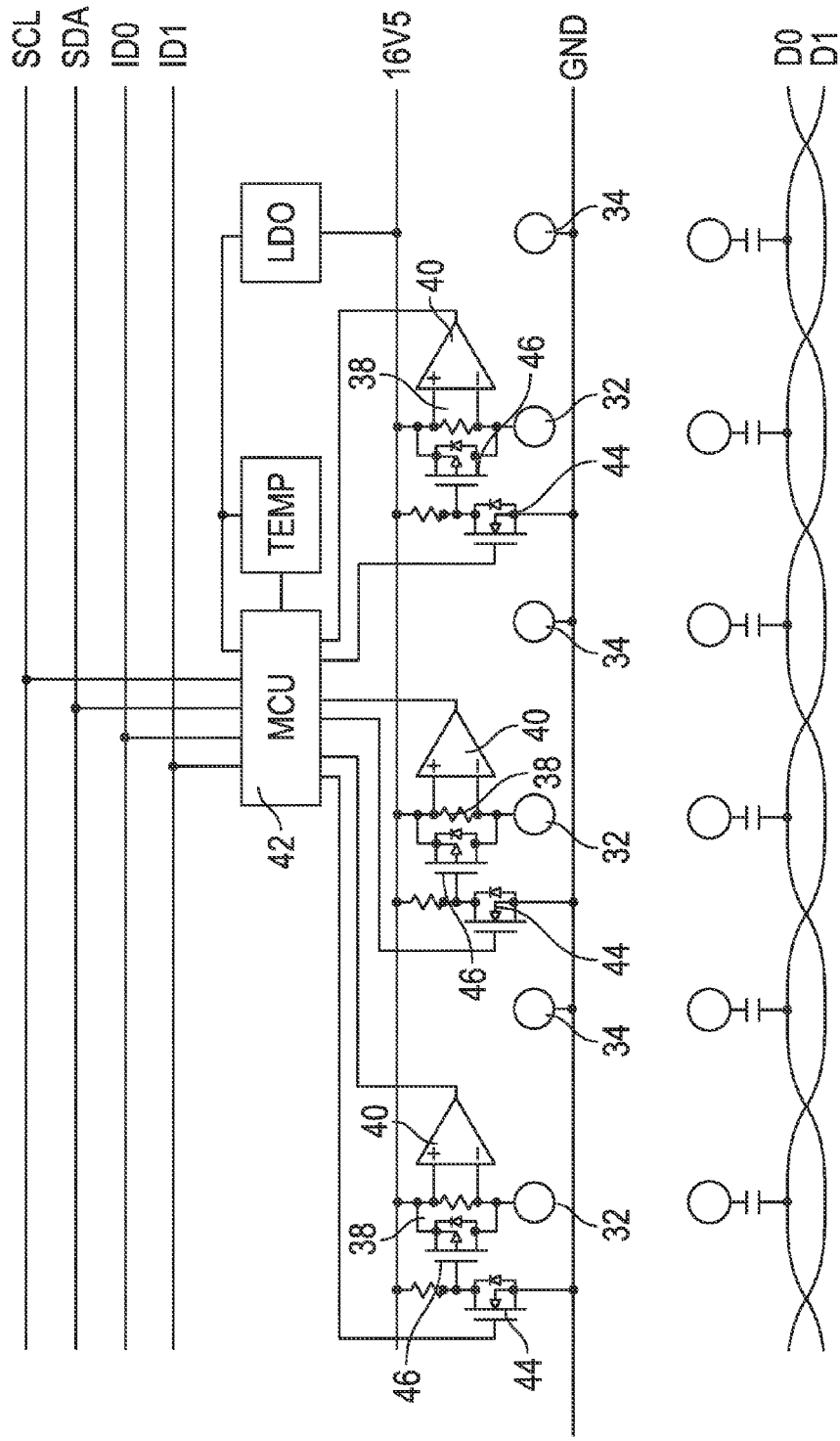
FIG. 8 illustrates electronics contained in the powering rail that may be utilized to determine the presence of an accessory coupled to the rail.
Figure 9A:
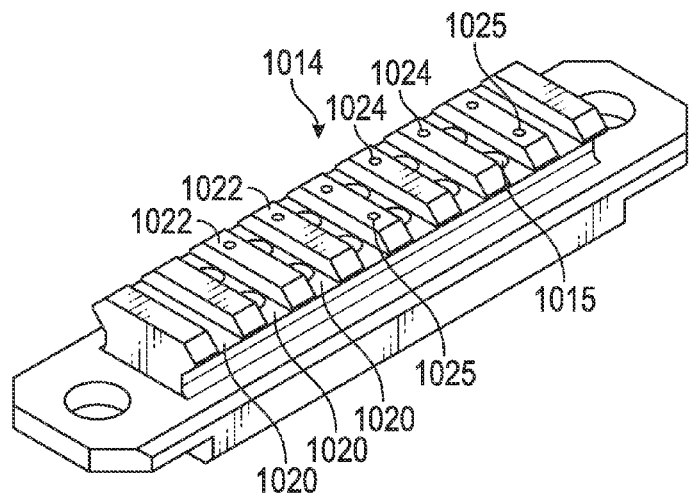
FIGS. 9A-9B show connections location on a rail for the transfer of power and data between the rail and an accessory.
Figure 9B:
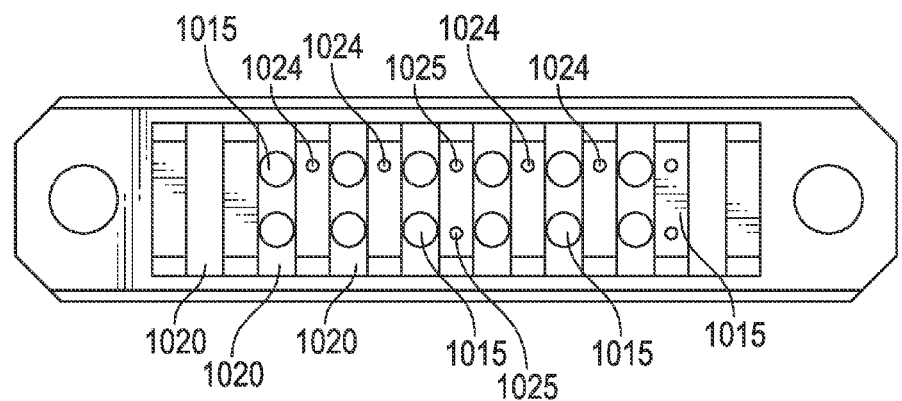

A non-limiting example, the electronics contained in the powering rail 18 are shown in FIG. 8. In one non-limiting embodiment and before an accessory 14 is installed and fully enabled, power (e.g., 16.5 Volts or any other desirable voltage) is supplied through a sense resistor 38 that limits the short-circuit current to several milliamps. This is enough power to allow an accessory 14 to communicate to the system through an op amp 40 but not enough to take the system down if the power 32 and ground pins 34 are shorted. This communication to the accessory 14 allows the system to detect if the accessory 14 is correctly installed on the rail 18 via the op amp and permitted to use full power. After the system determines that the accessory 14 is correctly installed and permitted, the system can provide full power by bypassing the sense resistor 38. For example, processor 42 will bypass the sense resistor 38 by changing the conductive states of MOSFETs 44 and 46.

In addition, the sense resistor 38 is also used to detect and measure the current supplied to the accessory 14. If the power exceeds a predetermined threshold the accessory 14 can be returned to a low-power mode to protect the system's battery from being drained.

As shown, an I2C bus is used by the system to communicate with the rail processor 42. As is known in the related arts the I2C (Inter-IC) bus is a bi-directional two-wire serial bus that provides a communication link between integrated circuits (ICs). There are three data transfer speeds for the I2C bus: low, medium and high-speed modes. All modes are backward compatible.

The 100 kb/s data channel, also called the low-speed data communication channel, is distributed within the system. Similarly to the conductive power transfer, the low speed channel is transferred conductively through the data pins. This is used to control the different accessories and transfer low speed data between the processor 51 and the accessories 14.

The 10 Mb/s data channel, also called the medium-speed data communication channel, is distributed within the system. It is sharing communication between rail slots with the low speed data channels and the data is transferred to the accessories in the same manner. The medium speed data channel path provides communication from one accessory to another accessory.

The 500 Mb/s data channel, also called the high-speed data communication channel, is distributed within the system electrically and in one embodiment may be also optically. This channel may use a dedicated optical data port/data port (not shown).

Accordingly, the rail 18 provides a simple differential pair for all data communication between accessories. As such, high-frequency narrow-band signaling between accessories may be possible. Different frequencies (Frequency Division Multiplexing) can be used to provide independent low-speed and high-speed links if desired. Future accessories with even higher bandwidth requirements can be accommodated easily by using new frequencies.

One example of a suitable narrow-band signaling that is very low in cost and power is the ZigBee protocol. ZigBee signals at 700 MHz will be used for low-speed communication (250 kbps) between the system and accessories. The differential signaling is used to ensure that the system does not emit any detectable signals and is less susceptible to any interference signals that may be present.

The system shown in FIG. 8 may employ a direct galvanic connection. With reference to FIGS. 9-19, details of a rail configuration designed to mount accessories such as sights, lasers and tactical lights is provided. This, as well as others rail configurations detailed herein, may be referred to as a Networked Powered Data System (NPDS) and is/are configured to provide power and data through a weapon coupled to accessories. Furthermore and in additional embodiments, the power and data may be exchanged between the weapon and/or a user coupled to the weapon by a tether and in some applications the user is linked to a communications network that will allow data transfer to other users who may or may not also have weapons with rail configurations that are coupled to the communications network.

In this embodiment, the conductively powering rail 1014 similar to the above embodiments comprises a plurality of rail slots 1020, rail ribs 1022 and pins 1024, in a configuration that allows for the mating of accessories with conductively powering rail 1014. However power and data transfer is facilitated by a conductive connection or coupling via power and data pins 1015 embedded into the rail 1014 and power and data pins 1017 embedded into an accessory 1042.

It shall be understood that the specific rail configuration is not limiting, as it may be adapted to any rail configuration. The preceding serves only as an example of several embodiments to which the conductively powering rail 1014 may be mated.

Pins 1024 and 1025 in one embodiment are formed of metal. For example, the pins may be formed of stainless steel pins of grade 430 and have configurations similar to those illustrated in the cross-sectional views illustrated in FIGS. 12 and 13.

With reference to FIG. 10, when an accessory is connected to conductively powering rail 1014, pins 1024, 1025 connect to magnets 1046, 1047 and trigger magnetic switch 1048, 1051 to indicate to the conductively powering rail 1014 that an accessory 1042 has been connected.

Pins 1024 are offset from the center of conductively powering rail 1014 to ensure an accessory is mounted in the correct orientation, for example a laser accessory or flashlight accessory could not be mounted backward, and point in the users face as it would be required to connect to pins 1024, to face away from the user of the firearm.

Figure 10A:
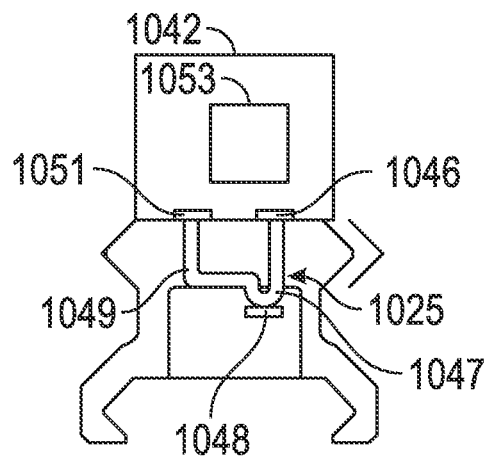
FIGS. 10A-10C illustrate more detailed versions of the components located in the rail/accessory utilized to determine when/how the accessory is coupled to the rail according to one embodiment.
Figure 10B:
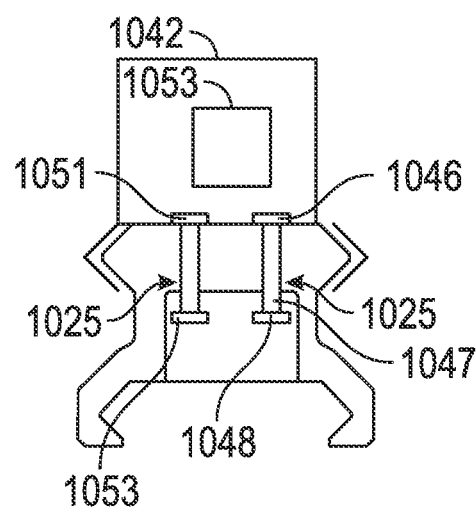
Figure 10C:
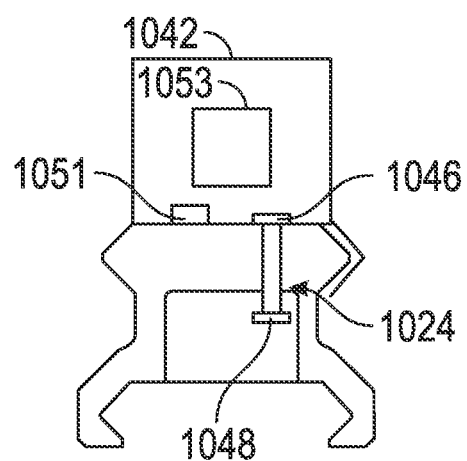

Referring now to FIGS. 10A and 10C when an accessory 1042 is connected to conductively powering rail 1014, pins 1024 and 1025 are magnetized by magnets 1046 located within each portion of the accessory configured to be positioned over the ribs 1022 of the rail 1014 such that pins 1024 and 1025 are magnetized by the magnets 1046. As illustrated in FIG. 10A, which is a cross sectional view of a portion of an accessory coupled to the rail, each pin 1025 is configured such that a first end 1045 is located on top of rib 1022, an intermediate portion 1047 of pin 1025 is located above magnetic switch 1048 and a second end 1049 is also located on rib 1022. Accordingly and when pin 1025 is magnetized by magnet 1046 in accessory 1042 when the accessory is placed upon the rail, the magnetized pin 1025 causes magnetic switch 1048 to close to indicate to the conductively powering rail 1014 that an accessory has been connected to the data slot D. An example of a magnetic switch is a hall effect sensor.

In addition and in this embodiment, accessory 1042 is provided with a magnetic accessory switch 1051 that is also closed by the magnetized pin 1025 which now returns to the surface of rib 1022. Here, the accessory via a signal from magnetic switch 1051 to a microprocessor resident upon the accessory will be able to determine that the accessory electronics 1053 associated with the switch 1051 in FIG. 10A is located above a data slot D and these electronics or equivalent items will be dedicated to data transfer only via conductive coupling. Accordingly, the data slot is different from the power slot (FIG. 10C) in that the associated pin is extended to become a fabricated clip to conduct the magnetic circuit from the accessory to the rail and back again to the accessory. The clip will provide a magnetic field which, will activate the solid state switch or other equivalent item located within the rail on the one side and then will provide a path for the magnetic field on the other side of the rail reaching up to the accessory. Similarly, the accessory will have a solid state switch or equivalent item located at each slot position which, will be closed only if it is in proximity with the activated magnetic field of the data slot. This provides detection of the presence and location of the adjacent data slot. In accordance with various embodiments disclosed herein, the accessory circuitry and software is configured to interface with the rail in terms of power and data communication.

In contrast and referring to FIG. 10C, which is a cross sectional view of an another portion of the accessory secured to the rail, the accessory electronics or other equivalent item 1053 associated with switch 1051 of the portion of the accessory illustrated in FIG. 10C will be able to determine that the accessory electronics 1053 associated with the switch 1051 in FIG. 10C is located above a power slot P and these electronics or equivalent items will be dedicated to power transfer only via conductive coupling. As mentioned, above the complimentary accessory may alternatively be configured to have a secondary electronics or equivalent item 1053, magnet 1046 and switch 1051 for each corresponding rib/slot combination of the rail they are placed on such that the accessory will be able to determine if it has been placed on a data only D of power only P slot/rib combination according to the output of switch 1051.

It being understood that in one alternative embodiment the electronics associated with a rib containing pin 1024 or pin 1025 (e.g., data or power) may in one non-limiting embodiment be on either side of the associated rib and accordingly the electronics or equivalent item of the accessory associated with switch 1051 will be located in a corresponding location on the accessory. For example, if the data slots are always forward (from a weapon view) from the rib having pin 1025 then the accessory will be configured to have the corresponding electronics forward from its corresponding switch 1051. Of course and in an alternative configuration, the configuration could be exactly opposite. It being understood that the ribs at the end of the rail may only have one slot associated with it or the rail itself could possible end with a slot instead of a rib.

Still further and in another alternative embodiment, the slots on either side of the rib having pin 1025 may both be data slots as opposed to a single data slot wherein a data/power slot configuration may be as follows: . . . D, D, P, P, D, D, . . . as opposed to . . . D, P, P, D, P, P . . . for the same six slot configurations however, and depending on the configuration of the accessory being coupled to the rail a device may now have two data slots (e.g., secondary electronics on either side of switch 1051 that are now activated for data transfer). Of course, any one of numerous combinations are contemplated to be within the scope of exemplary embodiments of the present invention and the specific configurations disclosed herein are merely provided as non-limiting examples.

As in the previous embodiment and should the accessory be removed and the connection between the accessory and the rail is broken, the change in the state of the switch 1051 and switch 1048 is recognized by the system managing conductively powering rail 1014. As in the previous embodiment, pins 1024 can be offset from the center of conductively powering rail 1014 to ensure an accessory is mounted in the correct orientation.

In yet another alternative and referring now to FIG. 10B, a pair of pins 1025 are provided in the data slot and a pair of separate magnets (accessory magnet and rail magnet are used). Here the pins are separated from each other and one pin 1025, illustrated on the right side of the FIG., is associated with the accessory magnet 1046 and rail switch 1048 similar to the FIG. 10A embodiment however, the other pin 1025 illustrated on the left side of the FIG., is associated with the accessory switch 1051 and a separate rail magnet 1053, now located in the rail. Operation of accessory switch 1051 and rail switch 1048 are similar to the previous embodiments.

Power and data to and from the accessory is provided by a plurality of power and data pins or contacts 1015 embedded into the rail 1014 and power and data pins or contacts 1017 embedded into an accessory 1042. Accordingly, a galvanically coupled conductive rail power and communication distribution method for the rail system is provided.

Figure 11A:
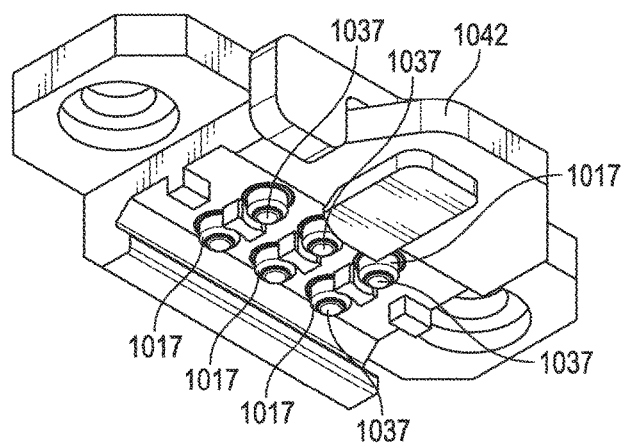
Figure 11B:
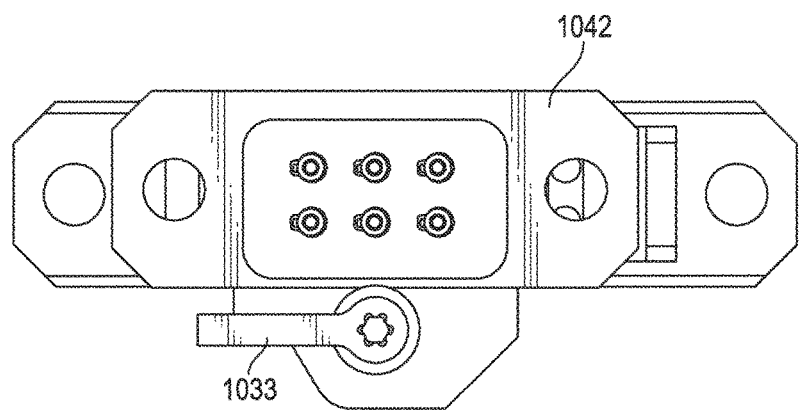
Figure 12:
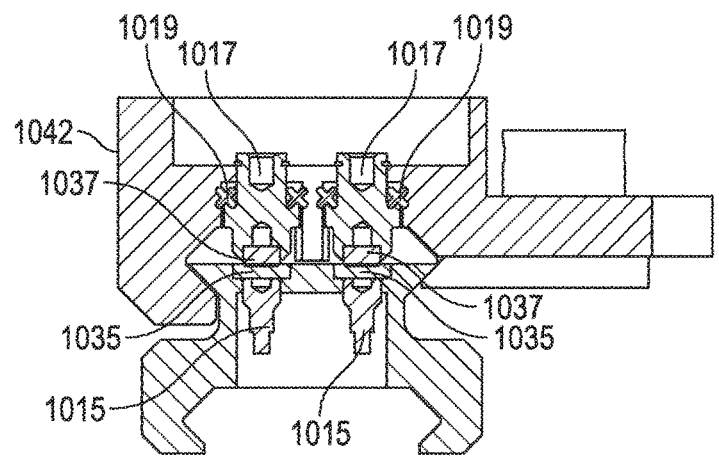
Figure 13:
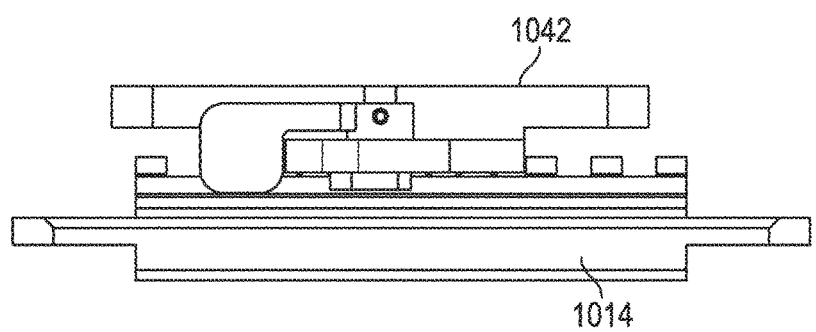
Figure 14:
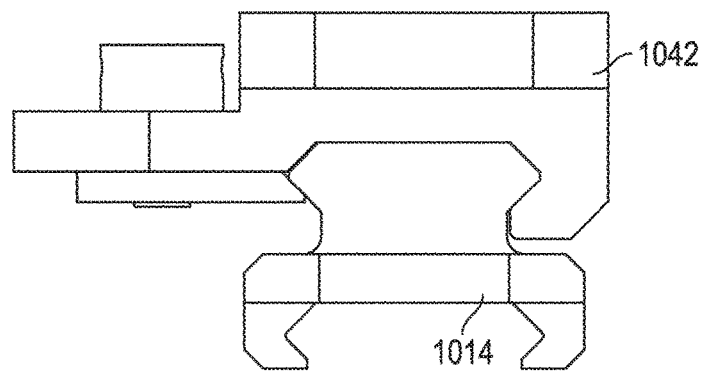
Figure 15:
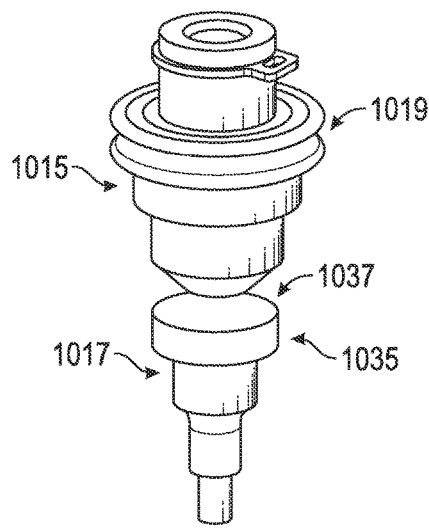
FIGS. 15-19G show different configuration of rail/accessory pins.

Referring to FIGS. 11-13, in one embodiment, the exposed conductive metal rail contacts or contact surfaces 1035 and 1037 of pins 1015 and 1017 are formed by coating copper pins with nickel or a nickel alloy for excellent durability and corrosion resistance to most environmental elements. Alternatively, they may be coated with a tungsten or a tungsten alloy. Accordingly and as described herein, power and/or data may be transferred bidirectionally to and from at least one accessory and the rail via direct contact of the conductive contact surfaces 1035 and 1037 of pins 1015 and 1017. In one embodiment, the contact surfaces are round pads, pressed against each other to make good galvanic contact. In another embodiment, copper pins coated with nickel are used. The pads, both in the rail and the accessory, are permanently bonded to short posts of copper or other metal, that in turn, are electrically bonded to PCB substrates, rigid in the rail and flex in the accessory so that there is some give when the two surfaces are brought together. Accordingly, at least one of the pads in each contact pair provides some mechanical compliance, and in one embodiment the accessory is the item that have the mechanical compliance. Of course, this could also be in the rail or both.

In one embodiment and as illustrated in at least FIGS. 15-19 the pin/pad assemblies use an X-section ring 1019 as a seal and compressible bearing 1021, with the internal connection end attached to a flex PCB. The pin/pad construction is shown in at least FIG. 17. The pads provide durability where the extreme G-forces of weapon firing vibrate the accessory attachment structure. The hardness of the touching contact surfaces ensures that little if any abrasion will take place as the surfaces slip minutely against each other. The pressure of the seal bearing (x-ring) will keep the pads firmly pressed together during the firing vibration, keeping electrical chatter of the contacts at minimal levels.

As illustrated and in one embodiment, the slot contacts are composed of small "pucks" that are press-fit or brazed to a metal pin. Nickel or nickel alloy exhibits a conductivity of roughly 5-10% that of copper and is considered a practical conductor. Assuming a good electrical bond between the puck and the pin, resistance introduced into the power path, accounting two traversals per round trip (Positive and Negative contacts).

Figure 16:
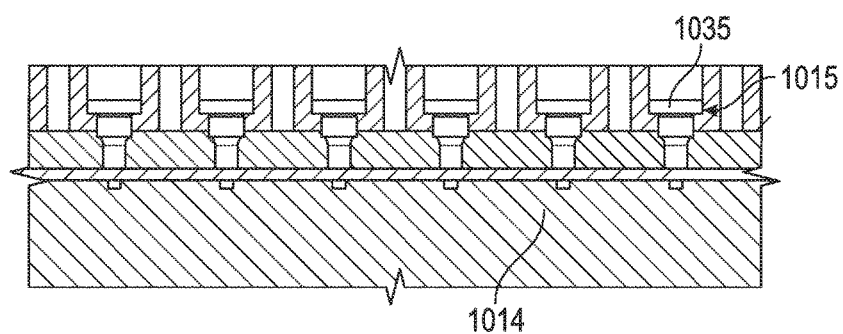
Figure 17:
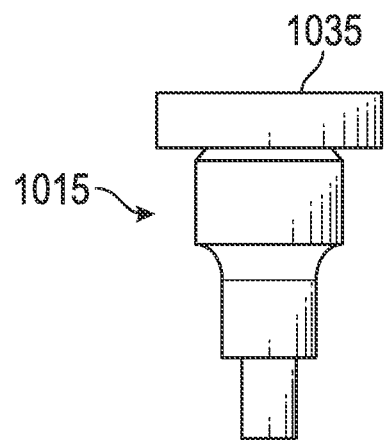
Figure 18:
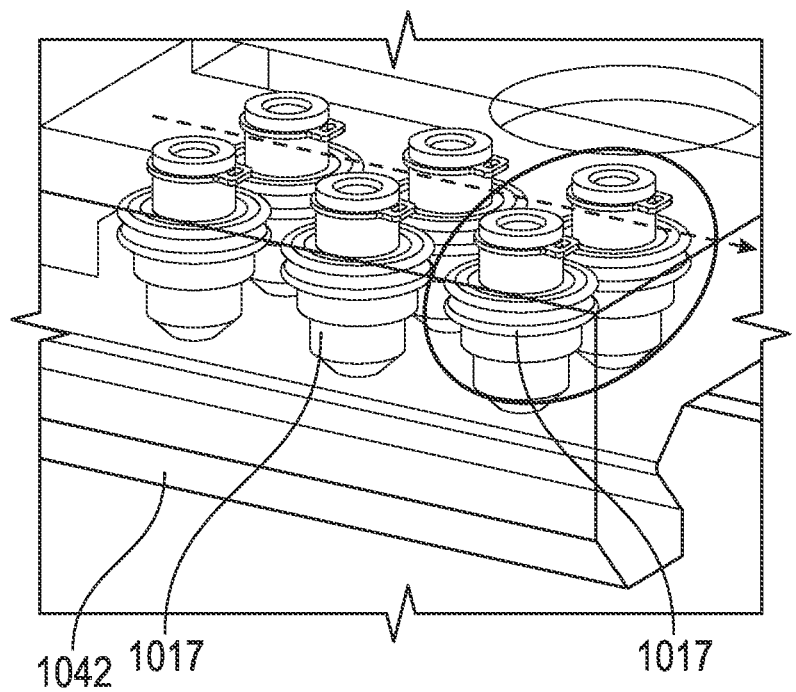
Figure 19A:
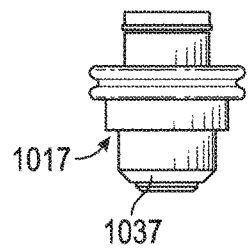
Figure 19B:
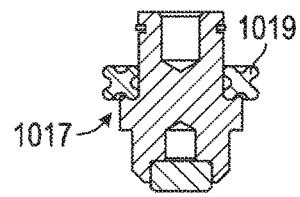
Figure 19C:
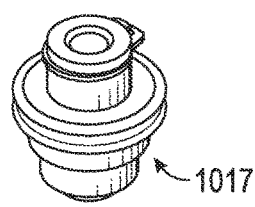
Figure 19D:
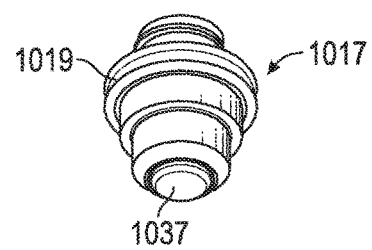
Figure 19E:
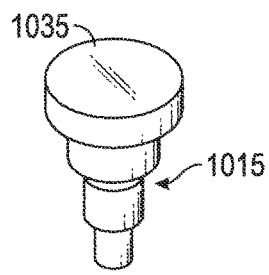
Figure 19F:
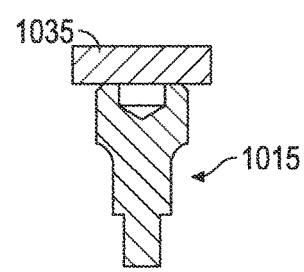
Figure 19G:
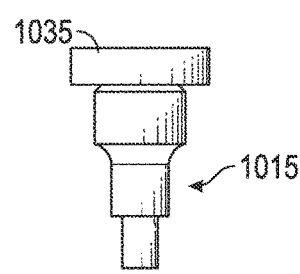

FIG. 16 illustrates the rail side pins and caps installed in the rail at each slot position. FIG. 18 also illustrates a rail side pin.

Non-limiting examples of suitable copper alloys for the pins are provided as follows: Copper Alloy 99.99% Cu Oxygen Free; 99.95% Cu 0.001% O; and 99.90% Cu 0.04% O of course, numerous other ranges are contemplated.

Non-limiting examples of suitable Nickel to coat the pins may have: Electrical Conductivity: 9-15 kS/cm; Electrical Resistivity: 65-115 µΩ-cm; Hardness: 490-570 Vickers Hardness; and Density: 8.1-8.3 g/cm$^3$ Nickel is desired for its hardness and corrosion/oxidation resistance. The ultra-hard contact surface will ensure excellent abrasion endurance under the extreme acceleration stresses of weapon firing. In one embodiment, unpolished contact surfaces may be used.

Moreover, the hardness of nickel or nickel alloy has virtually no malleability or sponginess, unlike softer metals like copper and lead. This means that two surfaces forced together will touch at the tallest micro-level surface features with little or no deformation of the peaks. This consequently small contact area will yield a resistance level that is much higher, possibly by orders of magnitude, over the expected theoretical resistance. Of course, other metals, alloys or materials are contemplated for use with various embodiments of the present invention.

In one embodiment, the conductive networked power and data system (CNPDS) is a four-rail (top, bottom, left, right) system that distributes power and provides communication service to accessories that are mounted on any of the rails as well as the base of the grip.

In one embodiment and wherever possible, semiconductor elements associated with the power transfer path will be moved to locations external to the CNPDS. Presumably, those external elements can be viewed and managed as field replaceable items of far less cost and effort to replace than the rail system itself.

All elements of system communication will have the ability to be powered down into standby mode. Slot power control is in one embodiment a desired feature for meeting power conservation goals, and the operation will be largely based on the magnetic activation principle mentioned above.

In one embodiment, each power slot is unconditionally OFF when there is no activating magnet present on its respective magnetic switch (e.g. Hall effect sensor). When an accessory with an appropriately located magnet is installed, the Hall effect sensor permits activation of the slot power but does not itself turn the power ON while the system is in normal operating state. The actual activation of the power switches is left to the MCU, allowing it to activate slots that are understood to be occupied, while keeping all others OFF.

In one embodiment, there are two primary system states that define the operating mode of the slot power switches. The first state is normal operating mode, either during maintenance/configuration, or in actual use. In this state, the processor (e.g., processors 42 or 51) I/O extension logic controls the power switch and the switch is only activated when commanded to do so.

The second state is defined as the Safe Power Only (SPO) mode, where the processor assumed to be incapacitated and is unable or not sane enough to control the slot power directly. The condition is signaled to the rails from the processor through a failsafe watchdog hardware mechanism, using either the absence of logic supply or a separate SPO flag signal. Under SPO state, the Hall effect sensor signal overrides the logic control to activate the respective slot power unconditionally where an accessory is attached, assuming the system main power is also present. The primary consequence of this mode is loss of light load efficiency, since the processors would normally shut down the Hall effect sensors to conserve power. Accessory ON-OFF control under the SPO condition is expected to be through a manual switch in the accessory.

In one embodiment, the rails, and any other CNPDS element that may be found to exceed+85C under operations heavy use, may have a temperature sensor embedded into it and readable by the MCU. Still further, the rails may actually have multiple sensors, one per 6-slot segment. With this provision, the system software can take protective actions when the rail temperature exceeds +85 C.

In other embodiments, other weapon systems may feature an electromechanical trigger, the system can be allowed to automatically limit the generation of heat by pacing the rate of fire to some predetermined level. In cases where the heat sensor participates in the fire control of the weapon, the sensor system would be necessarily engineered to the same reliability level of the Fire-by-Wire electronics.

The battery pack, now fully self-contained with charging system and charge state monitoring, will also contain a temperature sensor. Many battery chemistries have temperature limits for both charging and discharge, often with different temperature limits for each. The inclusion of a local temperature sensor in the battery pack will eliminate the need for the battery to depend on the CNPDS for temperature information, and thus allow the charge management to be fully autonomous.

The CNPDS will have slot position logic such that any accessory can be installed at any slot position on any of the rails, and can expect to receive power and communication access as long as the activation magnet is present.

In order to meet certain power transfer efficiencies and in one embodiment target, power and communication will not be shared among slot contacts, and will instead be arranged in a suitable power/comm. slot interleave on the rails.

In one non-limiting implementation, the CNPDS will be configured such that the slots are groups of six, which defines the basic kernel of slot count per rail. Here all four rails will be built up in multiples of the six slot kernel, where Side rails will be 6 or 12 slots each, the top rail will be 24 or 30 slots, and the bottom rail will be 12 or 18 slots. This aggregation is done to provide logical grouping of internal rail control logic resources and does not impact slot occupation rules.

In one embodiment, the CNPDS direct galvanic coupling can be engineered to provide over 15 Watts per slot on a single pair of contacts of course ranges greater or less than 15 Watts are contemplated.

The CNPDS provides a low impedance galvanic connection path between the battery pack and the contacts in the slots of the rails. Power at each slot is individually switched, using local magnetic sense activation combined with processor commands. In one embodiment, CNPDS slot arrangement on each rail will be an interleave of power and data slots. A structure for the CNPDS will aggregate groups of six slots into units that are concatenated to make up rail units of desired lengths. The management logic used to control the slot power is based on the grouping, thus the longer top and bottom rails may have several management logic blocks.

In one embodiment, the CNPDS will have an emergency power distribution mode in the event that the intelligent management and control systems (primarily the MCU) are incapacitated due to damage or malfunction. Under this mode, system control is assumed to be inoperative and the battery power is unconditionally available through individual slot Hall sensor activation.

In another embodiment, the CNPDS will have an alternative tether power connection which is a unidirectional input to the CNPDS, allowing the system to be powered and batteries to be charged from a weapon "Dock". The Tether connection provides direct access to the lower receiver power connector, battery power port, and MCU power input. By using a properly keyed custom connector for the Tether port, the OR-ing diode and any current limiting can be implemented off-weapon at the tether power source. The tether source should also contain inherent current limiting, same as the battery packs. These measures move protective components outside of the MCU to where they can be easily replaced in case of damage from power source malfunctions, rail slot overloads, or battle damage.

In another embodiment, the CNPDS will have a reverse power, mode wherein the slots on the rails can accept DC power that could run the system. The CNPDS is can be used with high-density rechargeable chemistry batteries such as Lithium-Ion (Li-Ion) or any other equivalent power supply.

The CNPDS communication infrastructure may comprise two distributed networks between the rails and the processor 51 which may be located in the grip. The primary communication network, defined as the data payload net, may be implemented as a 10Base2-like CSMA/CD line operation, supplying a 10 Mbit/sec Ethernet packet link from accessories on the rails to each other and/or to the Tether. The secondary network is defined as the system management net on which the processors 42/51 are masters and the rails are slave devices. Both networks operate in parallel without any dependencies between them. Accessories will only ever receive the primary packet bus and all accessory bound control and data transactions will funnel through that connection. The following diagram details the basic structure of the two networks within the CNPDS.

The communication structure has a very similar architecture to the power distribution structure of the CNPDS. The six slot grouping will similarly affect only the control subsystem aggregation and not impose limits on accessory slot alignment.

The accessory base illustrated in FIG. 11 can take on many forms with respect to footprint size. Depending on the power draw of the accessory, it may straddle several rail cores or one. An example of a three slot device is shown in the illustration of FIG. 11

Accessory clamping can be semi-permanent or quick release. In the semi-permanent scenario, this is achieved with a fork lock system illustrated in at least FIGS. 11-14 where the forks are pulled in to the rail with a thumb screw. Depending on the mass and geometry of the accessory, one or two fork assemblies may be required to securely mount it to the rail.

In the quick release scenario shown in FIG. 11B, a lever 1033 is employed to effectively move the lock system (prong) into place and hold position. As mentioned above, the weight and center of gravity will define which type is used and how many are required for mechanical strength.

In one non-limiting embodiment, electronic means of ensuring the accessory is installed correctly will be employed. In this scenario the system will identify the type and location of the accessory and provide power, communication or both. The accessory and the rail both have a 10 mm pitch such as to allow the lining up of accessory to rail slots and a shear area between accessory and rail to lock longitudinal relative movement between the two assemblies.

As discussed above, as an alternative to utilizing galvanic connections to transmit power or data, the coupler 520 (FIG. 6) could utilize inductive coupling to transmit power, data or both.

As such, disclosed is a firearm that includes an upper receiver; a lower receiver; a powered accessory mounted to a rail of the upper receiver; and an apparatus for inductively providing power and data to the powered accessory. In one embodiment, data is exclusively provided to the powered accessory from one of a plurality of coils located within the rail. In this embodiment, the powered accessory may include a plurality of coils and be configured to determine when one of the plurality of coils of the powered accessory is adjacent to the one of the plurality of coils of the rail.

In another embodiment, a weapon or firearm is provided, the weapon having: an upper receiver; a lower receiver; a powered accessory mounted to a rail of the upper receiver; and an apparatus for inductively networking a processor of the powered accessory to a processor of the upper receiver and a processor of the lower receiver (e.g., in the grip). In still another alternative embodiment, a method of networking a removable accessory of a weapon to a microcontroller of the weapon is provided, the method including the steps of: inductively transferring data between the accessory and the microcontroller via a first pair of coils exclusively dedicated to data transfer; inductively transferring power to the accessory via another pair of pair of coils exclusively dedicated to power transfer; and wherein the accessory is capable of determining the first pair of coils by magnetizing a pin located on the weapon.

In these embodiments connection between an accessory and the inductively powering rail is achieved by having electromagnets, which we refer to as "primary U-Cores" on the inductively powering rail and "secondary U-Cores" on the accessory. Once in contact with the inductively powering rail, through the use of primary and secondary U-cores, the accessory is able to obtain power though induction.

Embodiments avoid the need for exposed electrical contacts, which may corrode or cause electrical shorting when submerged, or subjected to shock and vibration. This eliminates the need for features such as wires, pinned connections or watertight covers.

Accessories may be attached to various fixture points on the inductively powering rail and are detected by the firearm once attached. The firearm will also be able to detect which accessory has been attached and the power required by the accessory.

Figure 21:
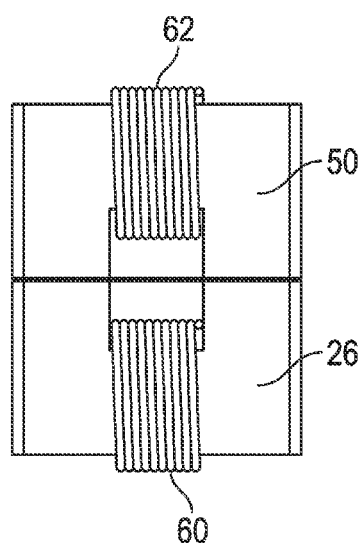
FIG. 21 is a cross section vertical view of a primacy U-Core and a secondary U-Core.

Referring now to FIG. 21, a cross section vertical view of a primacy U-Core and a secondary U-Core is shown. Primary U-Core 26 provides inductive power to an accessory when connected to inductively powering rail 18. Each of primary U-core 26 and secondary U-core 50 are electromagnets. The wire wrappings 60 and 62 provide an electromagnetic field to permit inductive power or data to be transmitted bi-directionally between inductively powering rail 18 and an accessory. Power/data sources for each primary U-core 26 or secondary U-core 50 may be provided by a plurality of sources. A power source may be within the firearm, it may be within an accessory or it may be provided by a source such as a battery pack contained in the uniform of the user that is connected to the firearm, or by a super capacitor connected to the system. These serve as examples of diverse power sources that may be utilize by embodiments of the invention.

Figure 22:
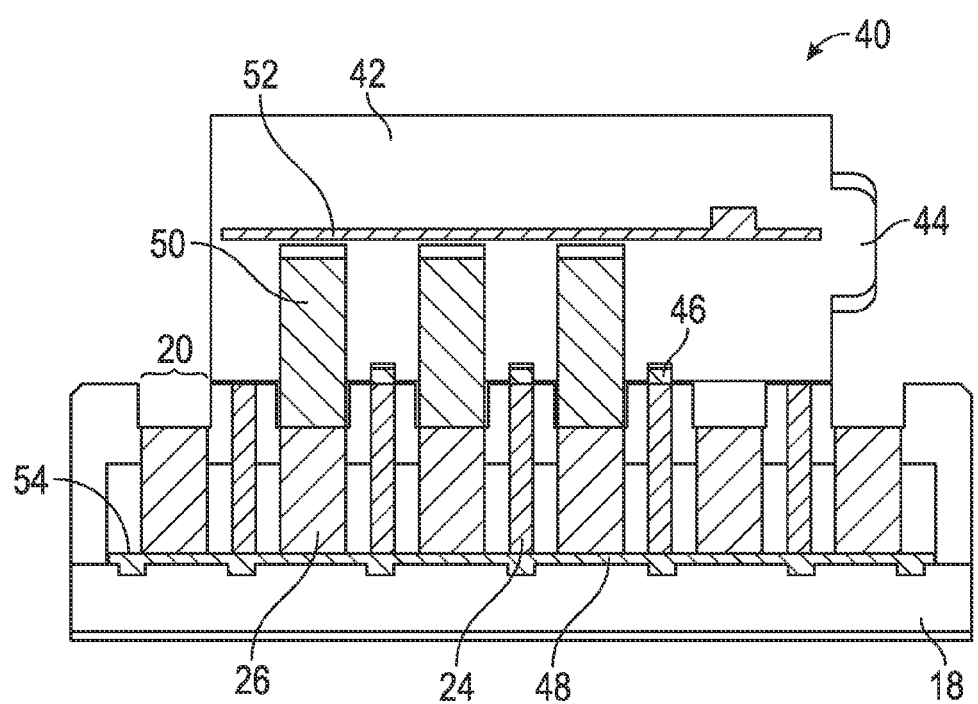
FIG. 22 is a longitudinal cross section side view of an accessory mounted to an inductively powering rail.

Referring now to FIG. 22, a longitudinal cross section side view of an accessory 14 mounted to an inductively powering rail 18 is shown. Accessory 14 in this example is a lighting accessory, having a forward facing lens 44. Accessory 14 connects to inductively powering rail 18, through magnets 46 which engage pins 24 and trigger magnetic switch 48 to establish an electrical connection, via primary PCB 54, to inductively powering rail 18.

As shown in FIG. 22, three connections have been established to inductively powering rail 18 through the use of magnets 46. In addition, three secondary U-cores 50 mate to three primary U-cores 26 to establish an inductive power source for accessory 42. To avoid cluttering the Figure, the connection of secondary U-core 50 and primary U-core 26 as an example of one such mating. This connection between U-cores 50 and 26 allows for the transmission of power to and from the system and the accessory. There may be any number of connections between an accessory 14 and an inductively powering rail 18, depending upon power requirements. In one embodiment each slot provides on the order of two watts. Of course, power transfers greater or less than two watts are considered to be within the scope of embodiments disclosed herein.

In both the accessory 14 and the inductively powering rail 18 are embedded Printed Circuit Boards (PCBs), which contain computer hardware and software to allow each to communicate with each other. The PCB for the accessory 14 is shown as accessory PCB 52. The PCB for the inductively powering rail 18 is shown as primary PCB 54. These features are described in detail with reference to FIGS. 24 and 25.

Referring now to FIG. 4 a block diagram of the components of an inductively powered rail system is shown generally as 70.

System 70 may be powered by a number of sources, all of which are controlled by master controller 72. (It shall be understood that MCU 72 could be either the bus processor 42 or processor 51 described above. Hot swap controller 74 serves to monitor and distribute power within system 7. Hot swap controller 74 monitors power from multiple sources. The first in one embodiment being one or more 18.5V batteries 78 contained within the system 70, for example in the stock or pistol grip of a firearm. This voltage has been chosen as optimal to deliver two watts to each inductively powering rail slot 20 to which an accessory 14 is connected.

This power is provided through conductive power path 82. A second source is an external power source 80, for example a power supply carried external to the system by the user. The user could connect this source to the system to provide power through conductive power path 82 to recharge battery 78. A third source may come from accessories, which may have their own auxiliary power source 102, i.e. they have a power source within them. When connected to the system, this feature is detected by master CPU 76 and the power source 102 may be utilized to provide power to other accessories through inductive power path 90, should it be needed.

Power is distributed either conductively or inductively. These two different distribution paths are shown as features 82 and 90 respectively. In essence, conductive power path 82 powers the inductively powering rail 18 while inductive power path 90 transfers power between the inductively powering rail 18 and accessories such as 14.

Master CPU 76 in one embodiment is a Texas Instrument model MSP430F228, a mixed signal processor, which oversees the management of system 70. Some of its functions include detecting when an accessory is connected or disconnected, determining the nature of an accessory, managing power usage in the system, and handling communications between the rail(s), accessories and the user.

Figure 23:
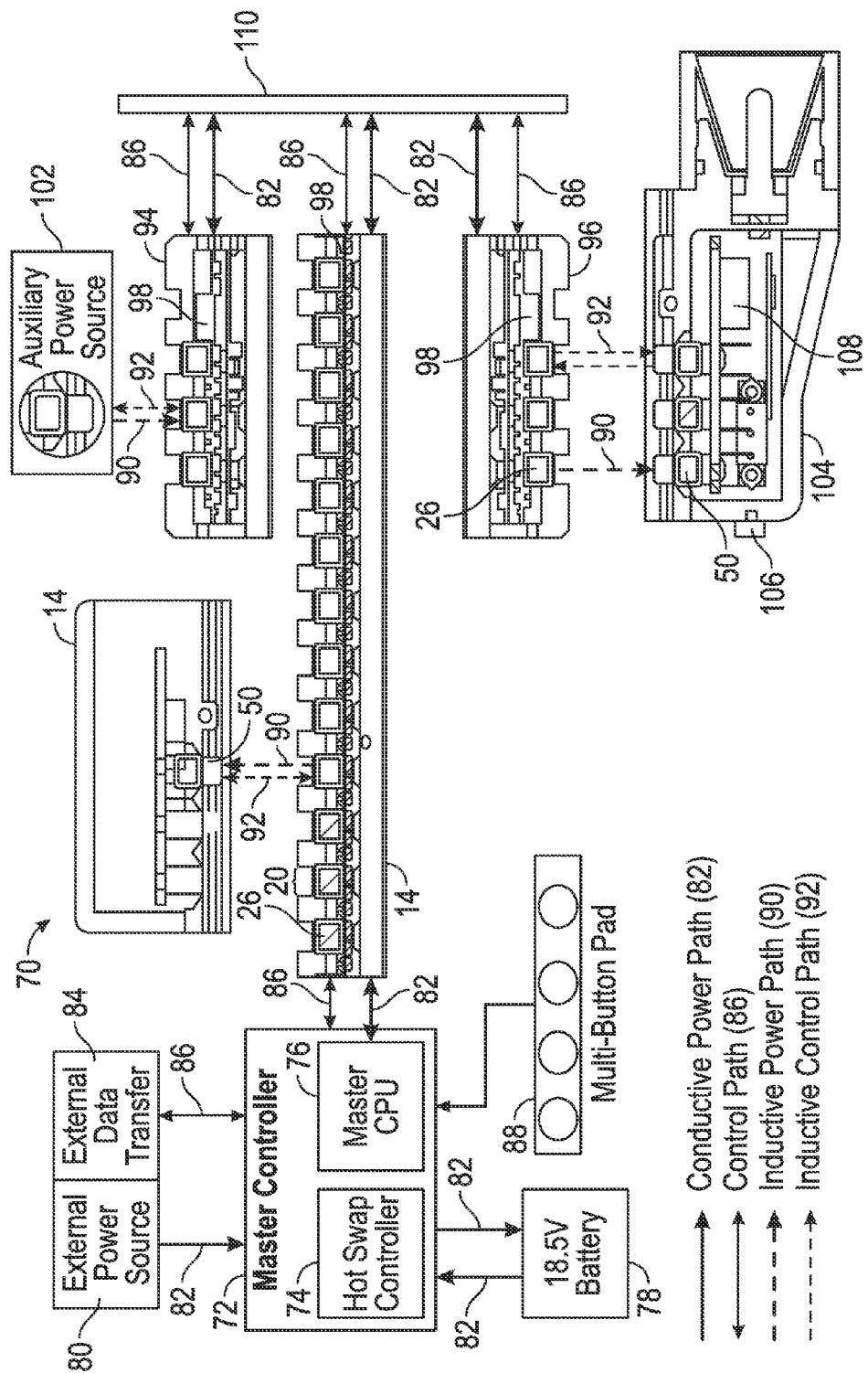
FIG. 23 is a block diagram of the components of one embodiment of an inductively powered rail system.

Shown in FIG. 23 are three rails. The first being the main inductively powering rail 18 and side rail units 94 and 96. Any number of rails may be utilized. Side rail units 94 and 96 are identical in configuration and function identically to inductively powering rail unit 18 save that they are mounted on the side of the firearm and have fewer inductively powered rail slots 20. Side rail units 94 and 96 communicate with master CPU 76 through communications bus 110, which also provides a path for conductive power. Communications are conducted through a control path 86. Thus Master CPU 76 is connected to inductively powering rail 18 and through rail 18 to the microcontrollers 98 of side rails 94 and 96. This connection permits the master CPU 76 to determine when an accessory has been connected, when it is disconnected, its power level and other data that may be useful to the user, such as GPS feedback or power level of an accessory or the system. Data that may be useful to a user is sent to external data transfer module 84 and displayed to the user. In addition data such as current power level, the use of an accessory power source and accessory identification may be transferred between accessories. Another example would be data indicating the range to a target which could be communicated to an accessory 14 such as a scope.

Communications may be conducted through an inductive control path 92. Once an accessory 14, such as an optical scope are connected to the system, it may communicate with the master CPU 76 through the use of inductive control paths 92. Once a connection has been made between an accessory and an inductively powering rail 18, 94 or 96 communication may be established from each rail via frequency modulation (for example) on an inductive control path 92, through the use of primary U-cores 26 and secondary U-Cores 50. Accessories such as 14 in turn communicate with master CPU 76 through rails 18, 94 or 96 by load modulation on the inductive control path 92, for example.

An example frequency modulation is Frequency Shift Key Modulation (FSK). A rail 18, 94, or 96 sends power to an accessory 42, by turning the power on and off to the primary U-core 26 and secondary U-core 50. This is achieved by applying a frequency on the order of 40 kHz. To communicate with an accessory 14 different frequencies may be utilized. By way of example 40 kHz and 50 kHz may be used to represent 0 and 1 respectively. By changing the frequency that the primary U-cores are turned on or off information may be sent to an accessory 42. Types of information that may be sent by inductive control path 92 may include asking the accessory information about itself, telling the accessory to enter low power mode, and asking the accessory to transfer power. Further, as described above, any information that the accessory may have may be provided to the CPU 76 and vice versa.

By the term load modulation the inventors mean monitoring the load on the system 70. If an accessory 14 decreases or increases the amount of power it requires then master CPU 76 will adjust the power requirements as needed.

Accessory 104 serves as an example of an accessory, being a tactical light. It has an external power on/off switch 106, which many accessories may have as well as a safe start component 108. Safe start component 108 serves to ensure that the accessory is properly connected and has appropriate power before turning the accessory on.

Multi button pad 88 may reside on the firearm containing system 70 or it may reside externally. Multi button pad 88 permits the user to turn accessories on or off or to receive specific data, for example the distance to a target or the current GPS location. Multi-button pad 88 allows a user to access features the system can provide through external data transfer module 84.

Figure 24:
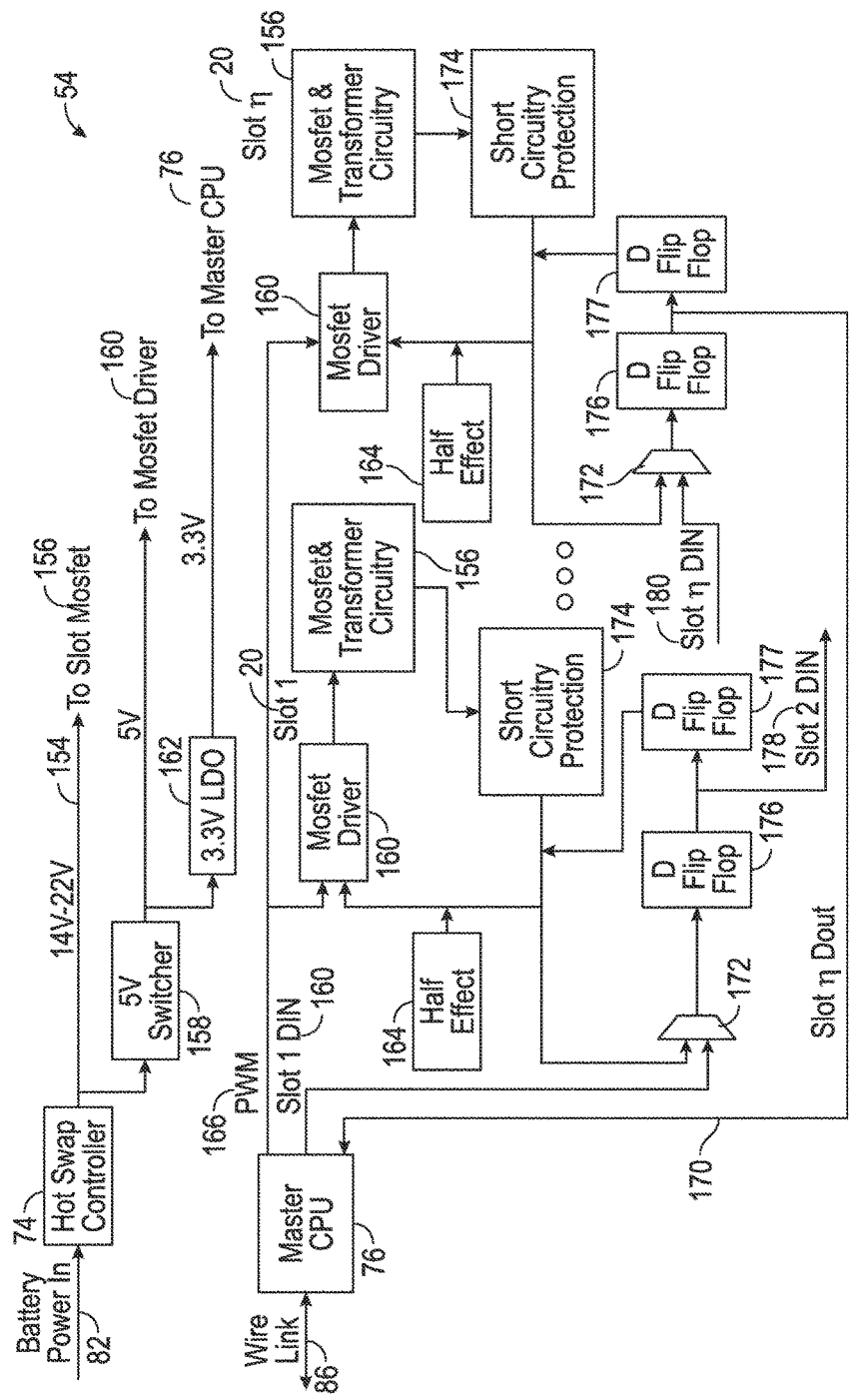
FIG. 24 is a block diagram of a primary Printed Circuit Board (PCB) contained within an inductively powering rail.

Referring now to FIG. 24 a block diagram of a primary Printed Circuit Board (PCB) contained within an inductively powering rail is shown as feature 54. Power is received by PCB 54 via conductive power path 82 from master controller 72 (see FIG. 23). Hot swap controller 74 serves to load the inductively powering rail 18 slowly. This reduces the amount of in rush current during power up. It also limits the amount of current that can be drawn from the inductively powering rail 18. Conductive power is distributed to two main components, the inductively powering rail slots 20 and the master CPU 76 residing on PCB 54.

Hot swap controller 74 provides via feature 154, voltage in the range of 14V to 22V which is sent to a MOSFET and transformer circuitry 156 for each inductively powering rail slot 20 on inductively powering rail 18.

Feature 158 is a 5V switcher that converts battery power to 5V for the use of MOSFET drivers 160. MOSFET drivers 160 turn the power on and off to MOSFET and transformer circuitry 156 which provides the power to each primary U-Core 26. Feature 162 is a 3.3V Linear Drop Out Regulator (LDO), which receives its power from 5V switcher 158. LDO 162 provides power to master CPU 76 and supporting logic within each slot. Supporting logic is Mutiplexer 172 and D Flip Flops 176.

The Multiplexer 172 and the D Flip-Flops 176, 177 are utilized as a serial shift register. Any number of multiplexers 172 and D Flip-Flops 176, 177 may be utilized, each for one inductively powered rail slot 20. This allows master CPU 76 to determine which slots are enabled or disabled and to also enable or disable a slot. The multiplexer 172 is used to select between shifting the bit from the previous slot or to provide a slot enable signal. The first D Flip Flop 176 latches the content of the Multiplexer 172 and the second D Flip-Flop 177 latches the value of D Flip-Flop 177 if a decision is made to enable or disable a slot.

Hall effect transistor 164 detects when an accessory is connected to inductively powering rail 18 and enables MOSFET driver 160.

Figure 25:
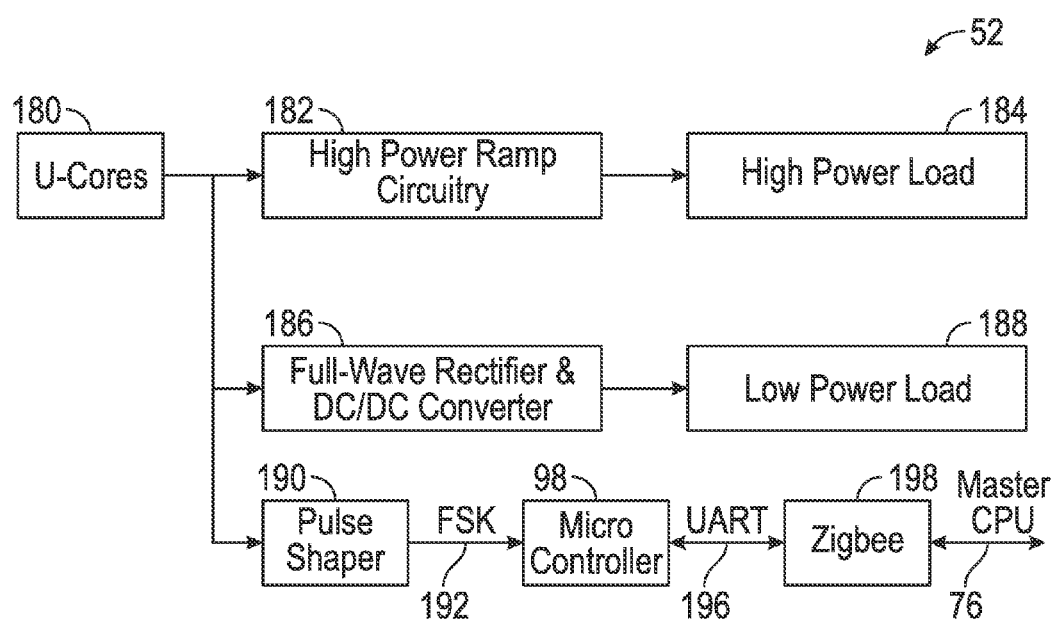
FIG. 25 is a block diagram of a PCB contained within an accessory.
Figure 26:
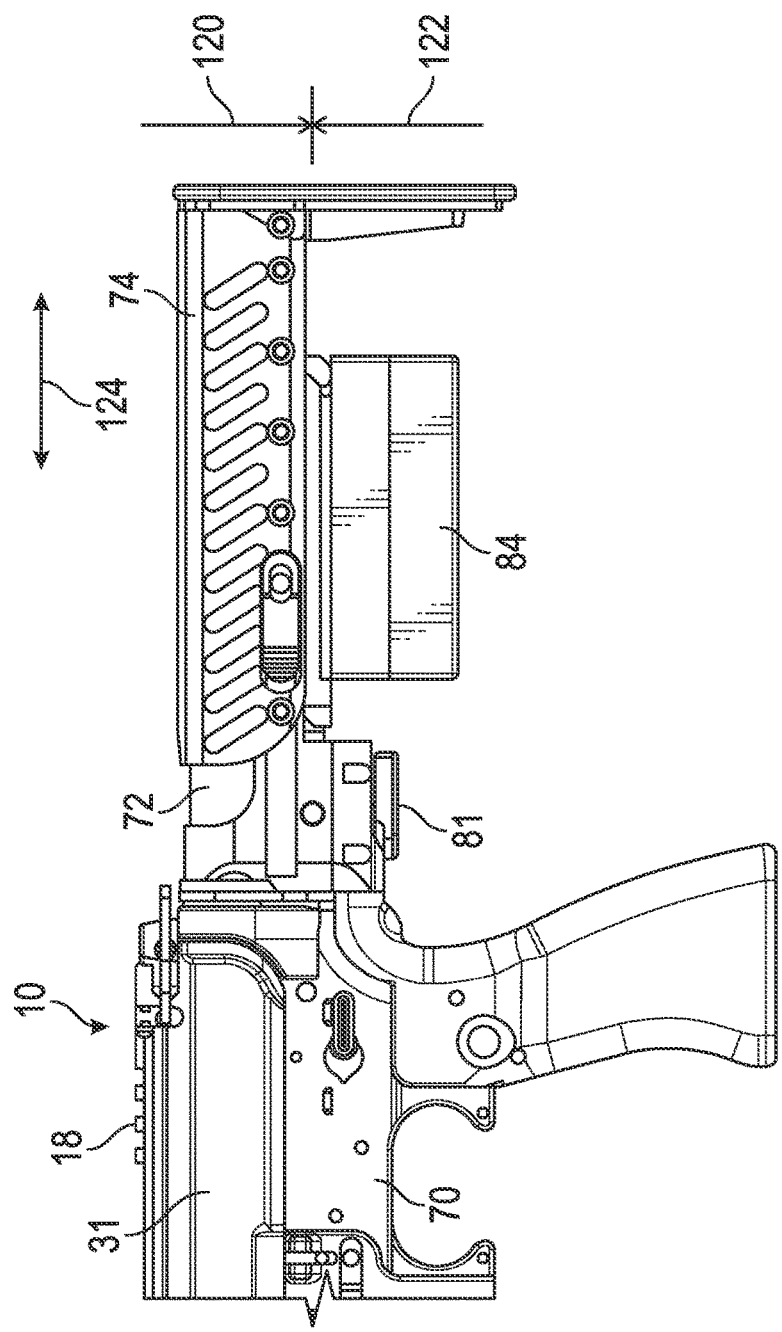
FIGS. 26-35 illustrate portions of the rifle, weapon or firearm in accordance with various non-limiting embodiments of the present invention.
Figure 27:
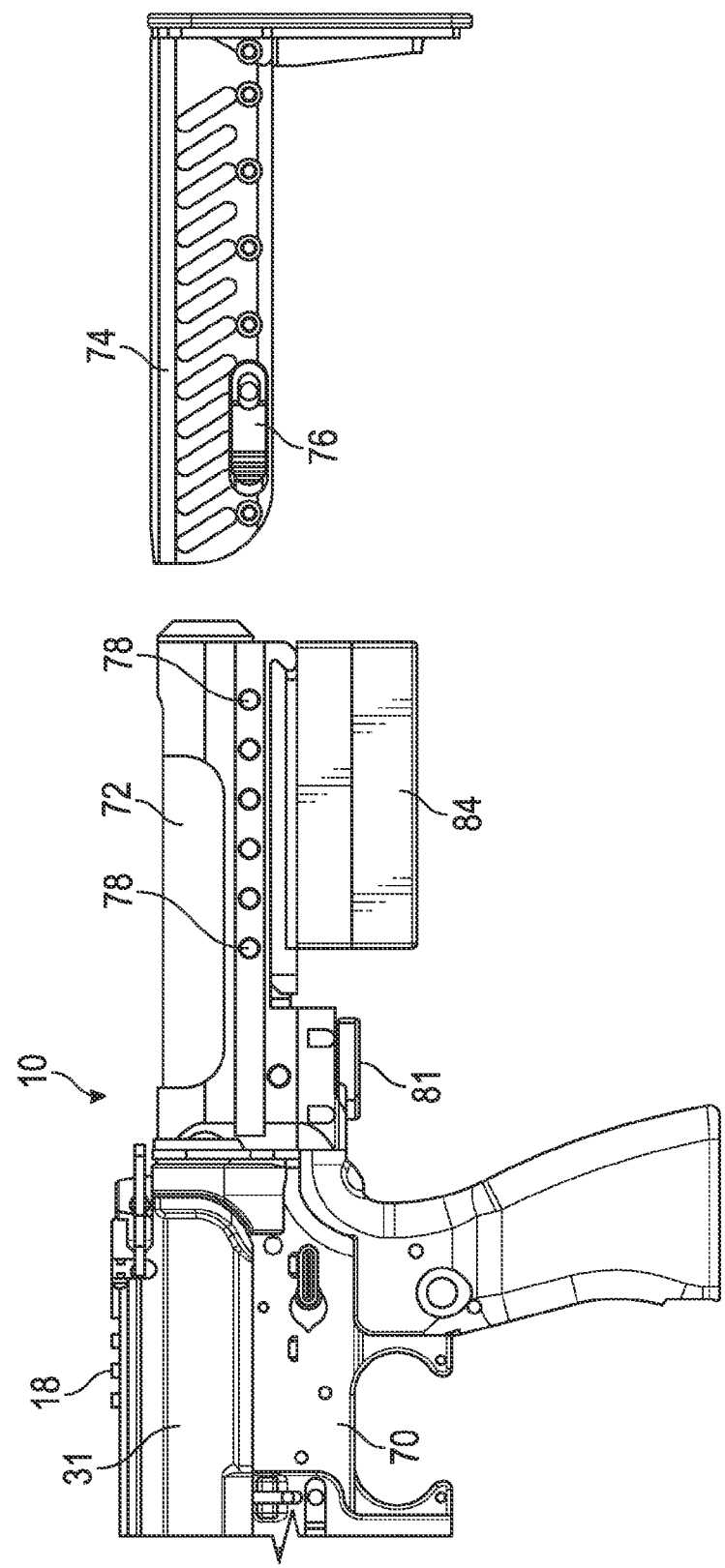
Figure 28:
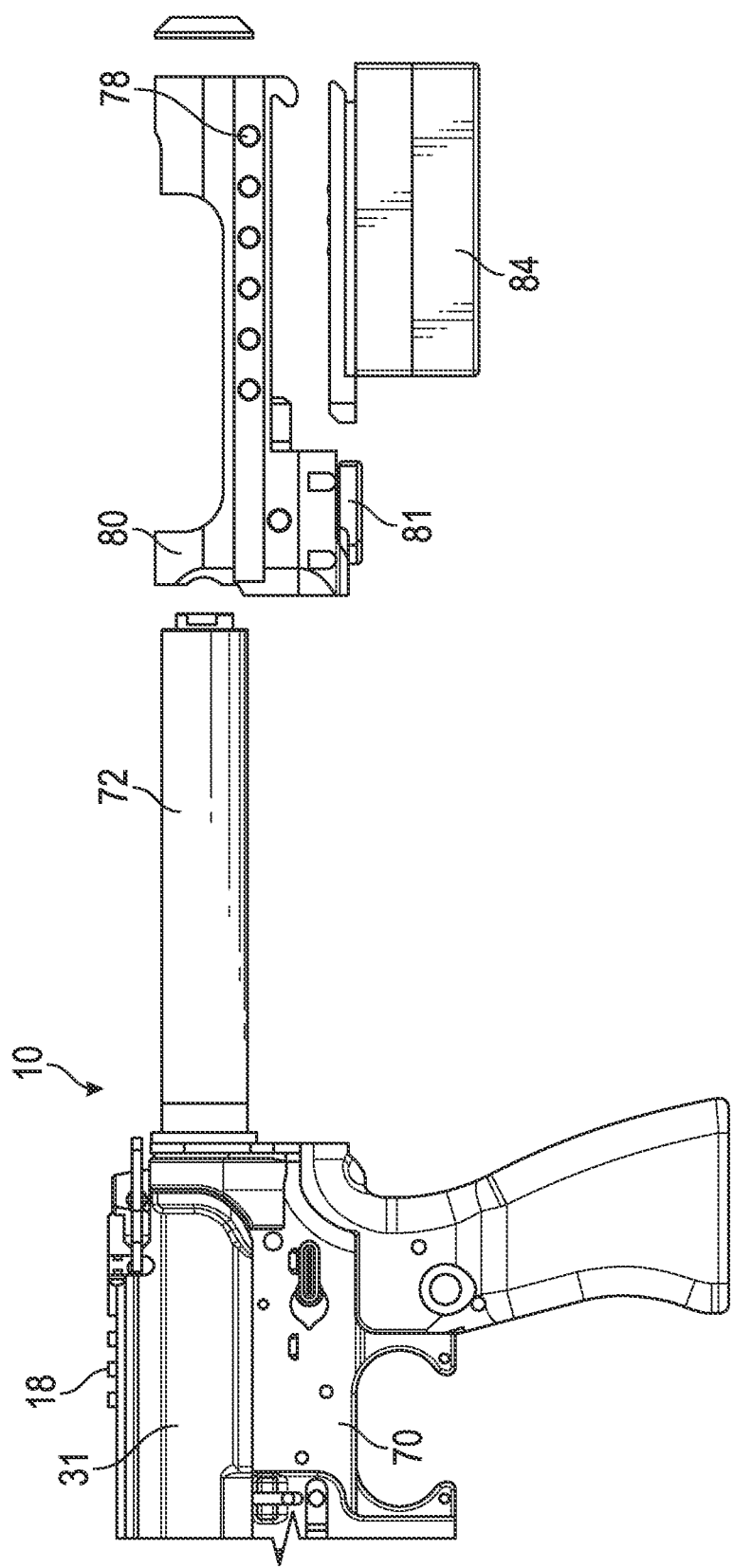
Figure 29:
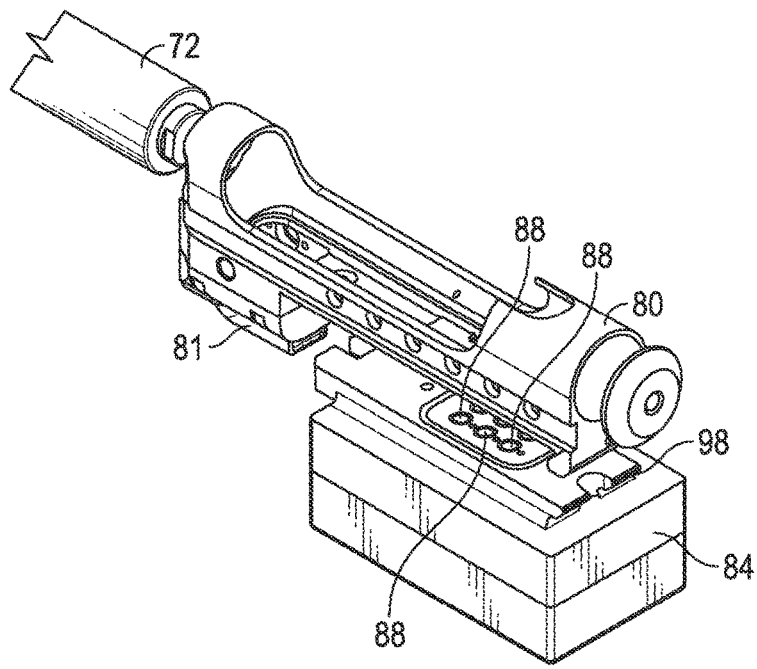
Figure 30:
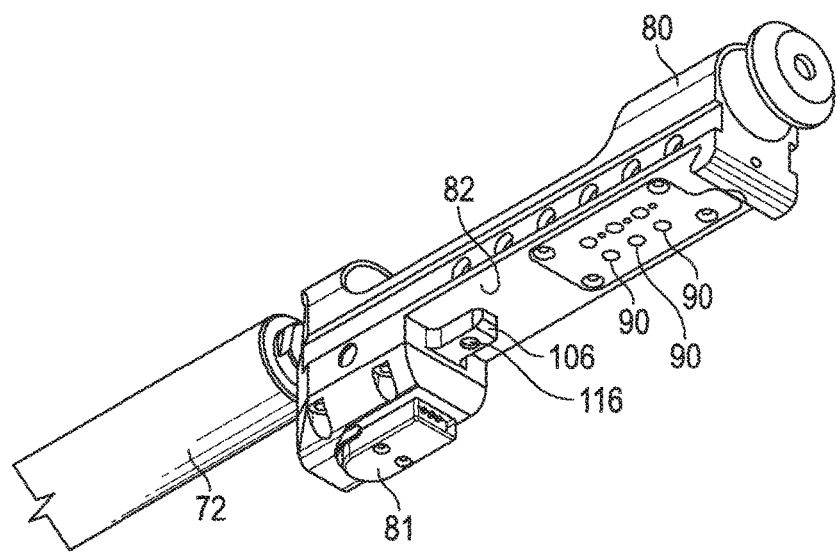

Referring now to FIG. 25 a block diagram of a PCB contained within an accessory such as 42 is shown generally as 52 Feature 180 refers to the primary U-Core 26 and the secondary U-Core 50, establishing a power connection between inductively powering rail 18 and accessory 42. High power ramp circuitry) 82 slowly ramps the voltage up to high power load when power is turned on. This is necessary as some accessories such as those that utilize XEON bulbs when turned on have low resistance and they draw excessive current. High power load 184 is an accessory that draws more than on the order of two watts of power.

Full wave rectifier and DC/DC Converter 186 rectifies the power from U-Cores 180 and converts it to a low power load 188, for an accessory such as a night vision scope. Pulse shaper 190 clamps the pulse fiam the U-Cores 180 so that it is within the acceptable ranges for microcontroller 98 and utilizes FSK via path 192 to provide a modified pulse to microcontroller 98. Microcontroller 98 utilizes a Zigbee component 198 via Universal Asynchronous Receiver Transmitter component (UART 196) to communicate between an accessory 42 and master controller 72. Examples of the types of information that may be communicated would include asking the accessory for information about itself, instructing the accessory to enter low power mode or to transfer power.

Referring now to FIGS. 26-32 a portion of the upper receiver 31 is illustrated secured to a lower receiver 70 of rifle, firearm or weapon 10. As illustrated, the rifle, firearm or weapon 10 has a buffer tube/receiver extension 72. A butt stock portion 74 is removably and movably secured to buffer tube/receiver extension 72 such that the location of butt stock portion 74 can be adjusted with respect to the buffer 2/receiver extension 72 by for example, a latch means 76 configured to allow a spring biased protrusion to engage one of a plurality of detents 78 located on a buffer tube housing portion 80 that is configured to be received upon buffer tube/receiver extension 72.

Figure 31:
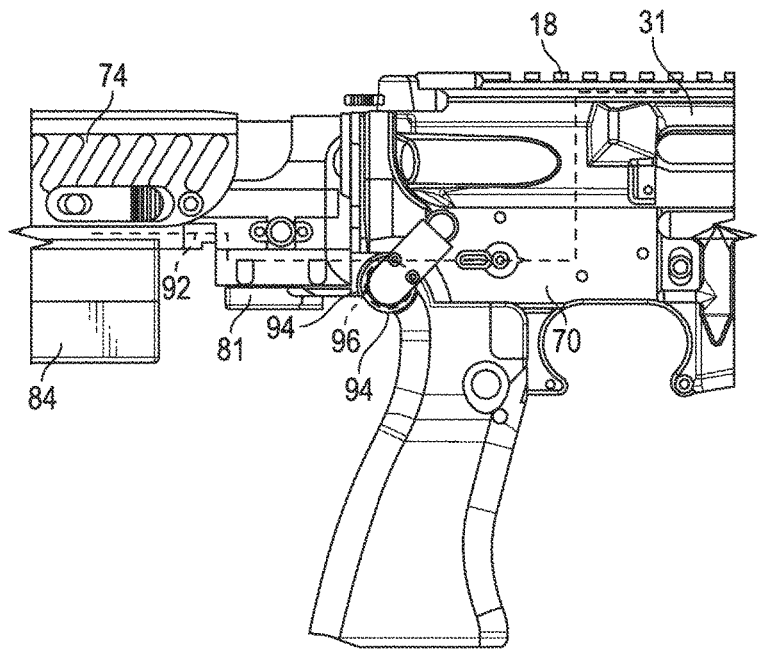
Figure 32:
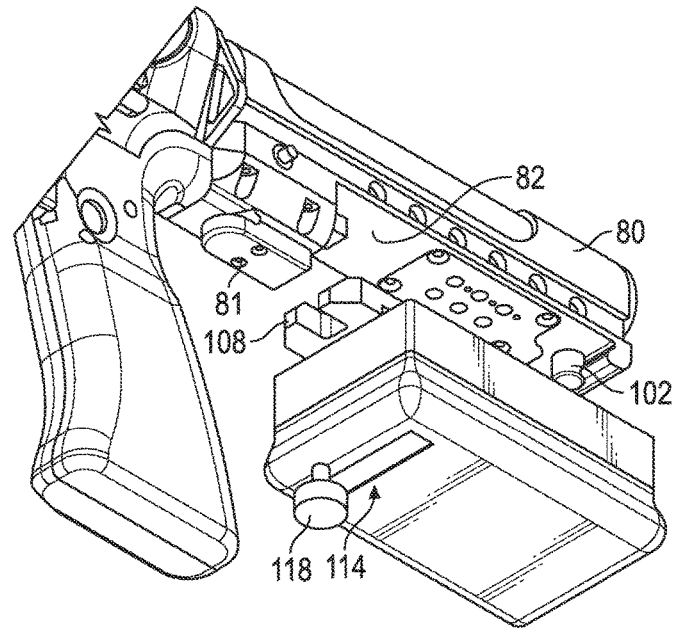
Figure 33:
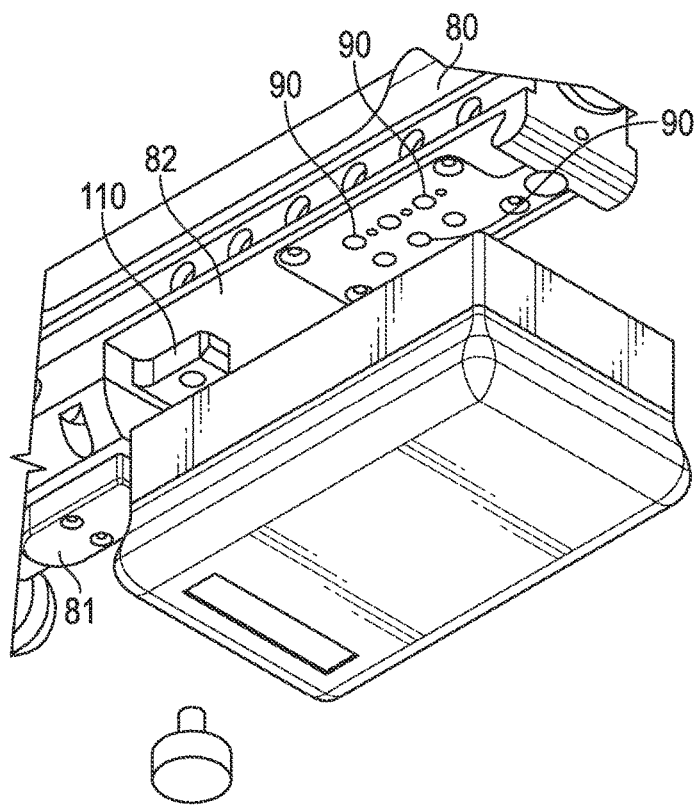
Figure 34:
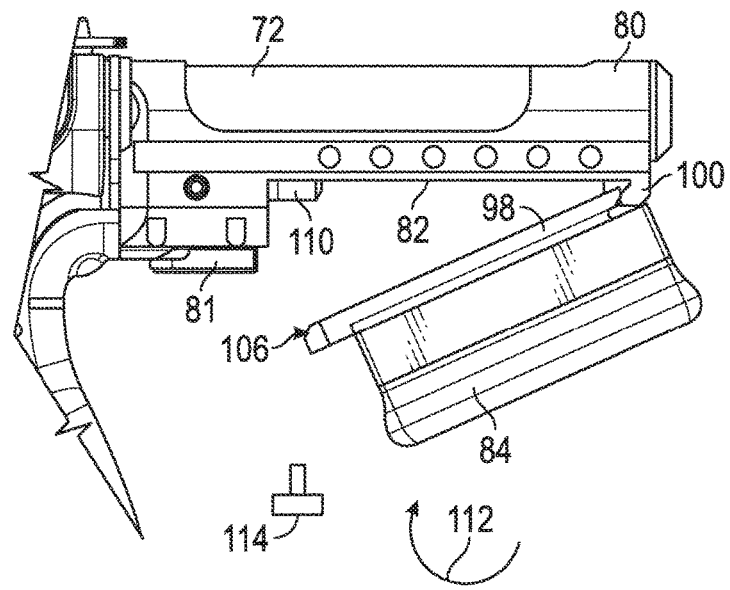
Figure 35:
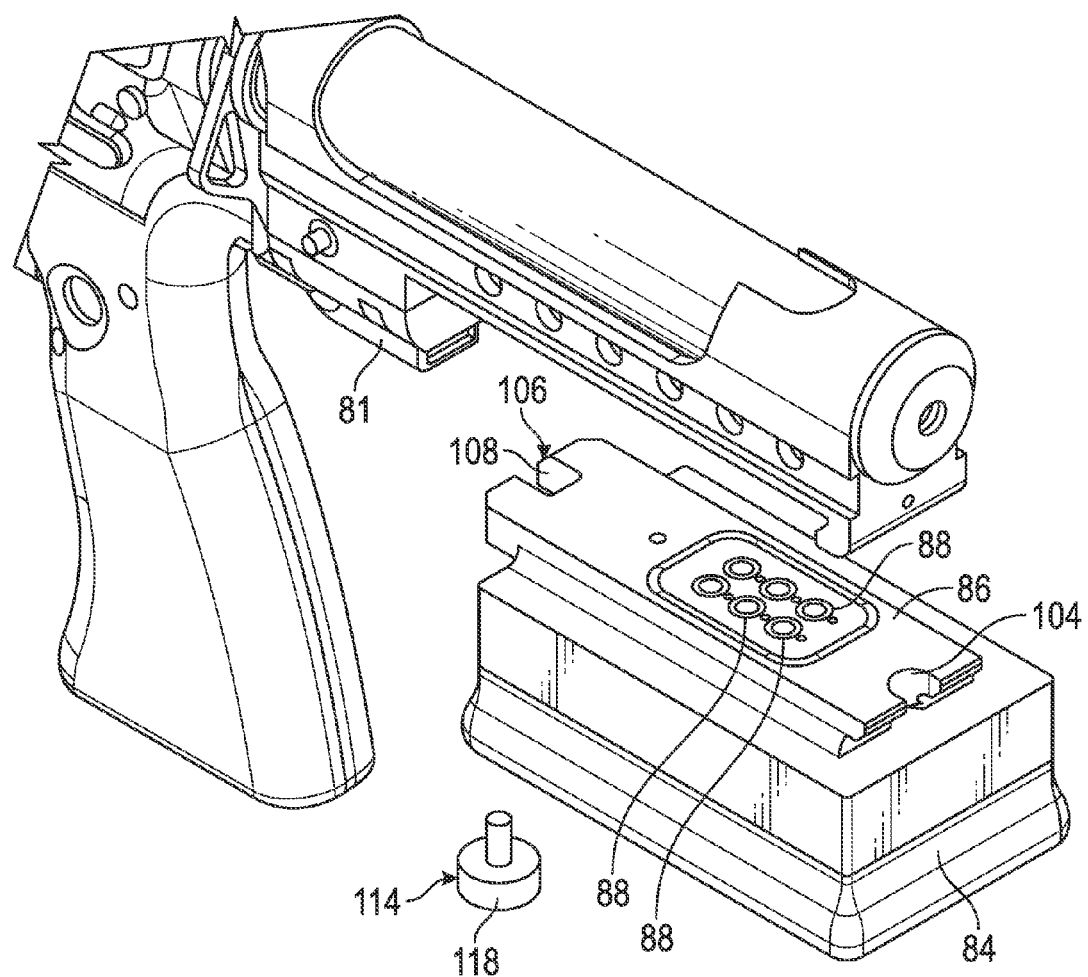
Figure 36:
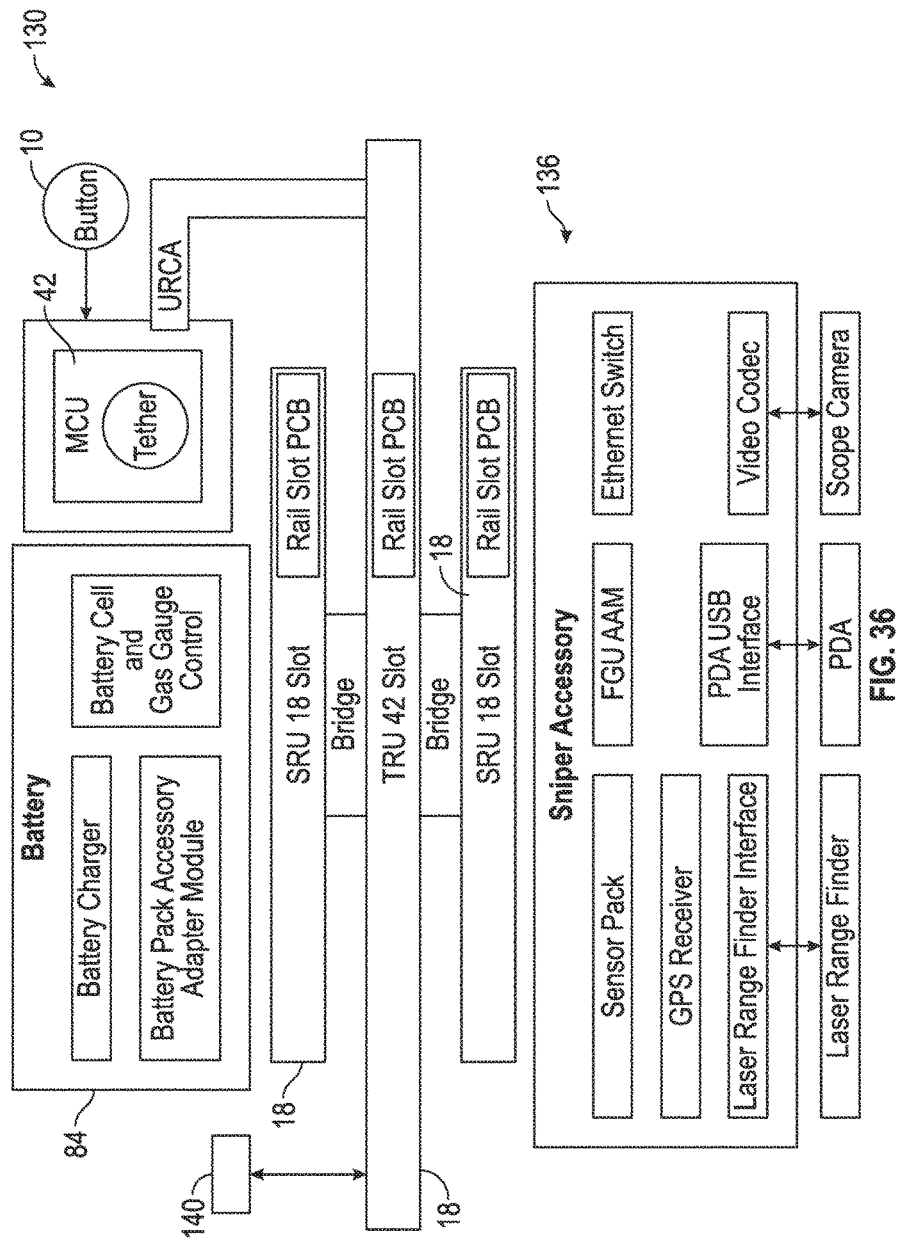
FIG. 36 is a schematic illustration of a network powered system in accordance with various non-limiting embodiments of the present invention.

As illustrated, a lower portion 82 of buffer tube housing portion 80 is configured to removably receive and engage a battery pack or power supply 84. A top surface 86 of the battery pack 84 is provided with a plurality of contact pins 88. Contact pins 88 are configured to make contact with a plurality of contacts 90 located on lower portion 82 of buffer to housing portion 80 so that when the battery pack 84 is secured to buffer tube housing portion 80 power can be supplied to the networked powered rail system via a conductive path(s) 92 that extend from contacts 90 to a rail connector 94 located on the lower receiver 70 that is configured to contact a complementary connector 96 when the upper receiver 31 is secured to the lower receiver 70. FIG. 31 shows connectors 94 and 96 between the upper 31 and lower receiver 70.

Connector 96 provides a conductive path to the processor 51 and other components of the powered rail 18. This will allow power to be transferred from the battery pack 84 as well as data to be transferred to external tether connection 81 of the lower receiver. The location of the connection 81 may be moved to any desired location. In addition, connector 96 is configured to disengage when the upper receiver 31 is removed from the lower receiver 70.

In order to provide a means for securing and removing battery pack 84 to buffer tube housing 80, a mechanical interface is contemplated. In one non-limiting embodiment, the battery pack 84 has a first contact feature 98 located at a rear portion of the battery pack 84. First contact feature 98 is configured to engage a rear abutment 100 of the buffer tube housing 80. In addition an alignment pin 102 may also be provided to engage a rear alignment feature or opening 104.

The battery pack 84, also has a second contact feature or front alignment feature 106. The second contact feature or front alignment feature 106 includes an opening 108 configured to receive a protrusion or feature 110, located on the lower surface 82 of the buffer tube housing 80. Accordingly, a user can secure battery pack or power supply 84 to the rifle, firearm or weapon 10 by simply causing the first contact feature 98 to engage the rear abutment 100 so that alignment pin 102 is received within alignment opening 104 and then the battery pack is pivoted upwardly in the direction of arrow 112, so that protrusion or feature 110 of the second contact feature a front alignment feature 106 is received within opening 108 of the battery pack or power supply 84. Once this occurs, the battery pack or power supply 84 is fixedly secured to the lower surface 82 of the buffer tube housing 80 via a retaining screw 114 that threateningly engages a threaded opening 116 of front alignment feature 106. In one embodiment, a head portion 118 of retaining screw 114 is slightly larger than opening 108 of the battery pack or power supply 84 such that when the battery pack 84 is secured to the lower portion 82 of the buffer tube housing 80 head portion 118 prevents the battery pack 84 from being disengaged from the buffer tube housing 80.

Of course, alternative arrangements for securing the battery pack 84 to the lower portion 82 of the buffer to housing are contemplated. For example, a snap fit interface can be provided at either or both the contact feature 98 the second contact feature such that a user can simply snap battery pack 84 onto lower surface 82 of the buffer to the housing 80.

As mentioned above, the upper surface of the battery pack 84 has a plurality of contacts 88 configured to contact complementary contacts 90 located on the lower surface 82 of the buffer tube housing portion 80. Once the battery pack 84 is secured to the buffer to the housing 80, a galvanic or conductive contact is made between contacts 88 and contacts 90 illustrated by arrows 120 and 122 of FIG. 10.

This conductive coupling or contact is approximately 90° off set with respect to a longitudinal axis 124 of the rifle 10. This positioning prevents disengagement of contacts 88 and 90 due to recoil of the rifle, weapon or firearm in the directions of arrows 124.

As mentioned above with regard to the powered rail 18, contacts 88 and 90 may comprise nickel coated materials. In yet another alternative non-limiting embodiment the contact surfaces of the contacts 88 and 90 are coated with a nickel composite, which in one non-limiting embodiment may be a nano-coat blend of primarily nickel and other materials such as cobalt which will exhibit similar or superior properties to nickel.

Referring now to FIGS. 38-41C portions of a powered rail 18 are illustrated. In one non-limiting embodiment, rail 18 may be configured to be secured to any one of rails 12 of the rifle, firearm or weapon 10. Alternatively, the configuration of rail 18 may be incorporated into any one of the rails 12 of the rifle, firearm or weapon 10 thus negating the need for a separately attached rail 18.

Although FIGS. 38, 38A-38C and 39 illustrates pin openings 209 in rail 18 it is understood that rail 18 may be configured without pin openings 209 as they are not necessary when the rail 18 is used with the accessory detection methods disclosed herein. Pin openings 209 allow for the use of pins to be inserted into openings 209, the pins are used with magnets and Hall effect sensors to detect the securement of an accessory secured to the powered rail 18, wherein the detection method is any of those described in co-pending patent applications referenced above.

Accordingly and in an alternative embodiment, the powered rail 18 of at least FIGS. 38-41C may also be used with the detection methods described in the above referenced pending patent applications (e.g. Hall effect sensors, magnets, and corresponding pins in addition to the data and power transfer pins) which are incorporated herein by reference thereto.

As illustrated, each slot 24 has a pair of contacts one of which is either a power contact 32 or a ground contact 34 while the other one is one of the data contacts D1 or DO as described above. In this embodiment, the rail 18 is considered to have a plurality of elongated openings 210 that are configured to receive a portion of a non-conductive rail insert 211 or in other words an insert 211 formed from a non-conductive material. More particularly, each opening 210 is configured to receive a complementary shaped feature 214 of insert 211. Each feature 214 has a pair of openings 216 and 218 that are configured to receive one of the plurality of pins 1015 and their associated contacts 1035 that are used for the aforementioned power, ground and data contact points located within the slots 24 of the powered rail 18. The openings 216, 218 of the insert 211 are configured such that the surface of the contacts 1035 of pins 48 are located on a surface within slots 24 so that they may be contacted by corresponding contacts 54 of an accessory 14 when it is secured to powered rail 18.

As shown and in one non-limiting embodiment, the insert 211 is molded as a single component and each of the features 214 are secured to each other via a bridge member 215. In other embodiments and depending on the length of rail 18, two or more inserts 211 are used together.

Figure 39:
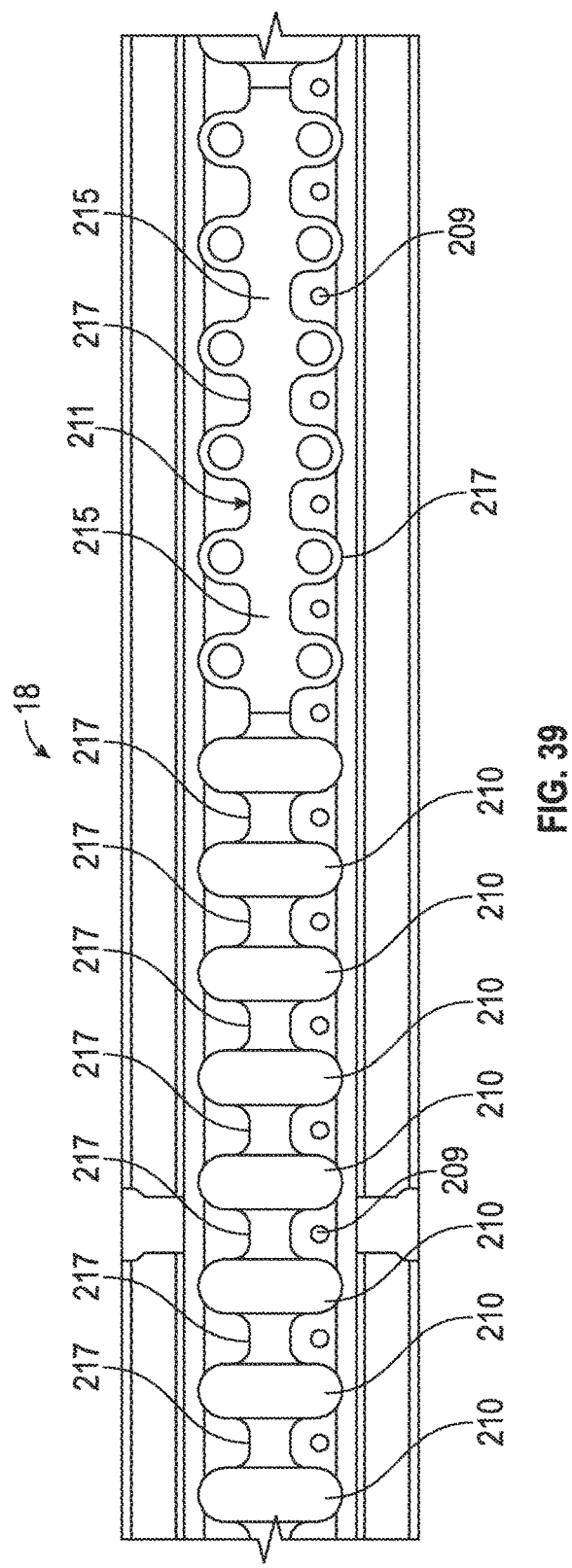
FIG. 39 illustrates a top plan view of a powered rail.
Figure 40:
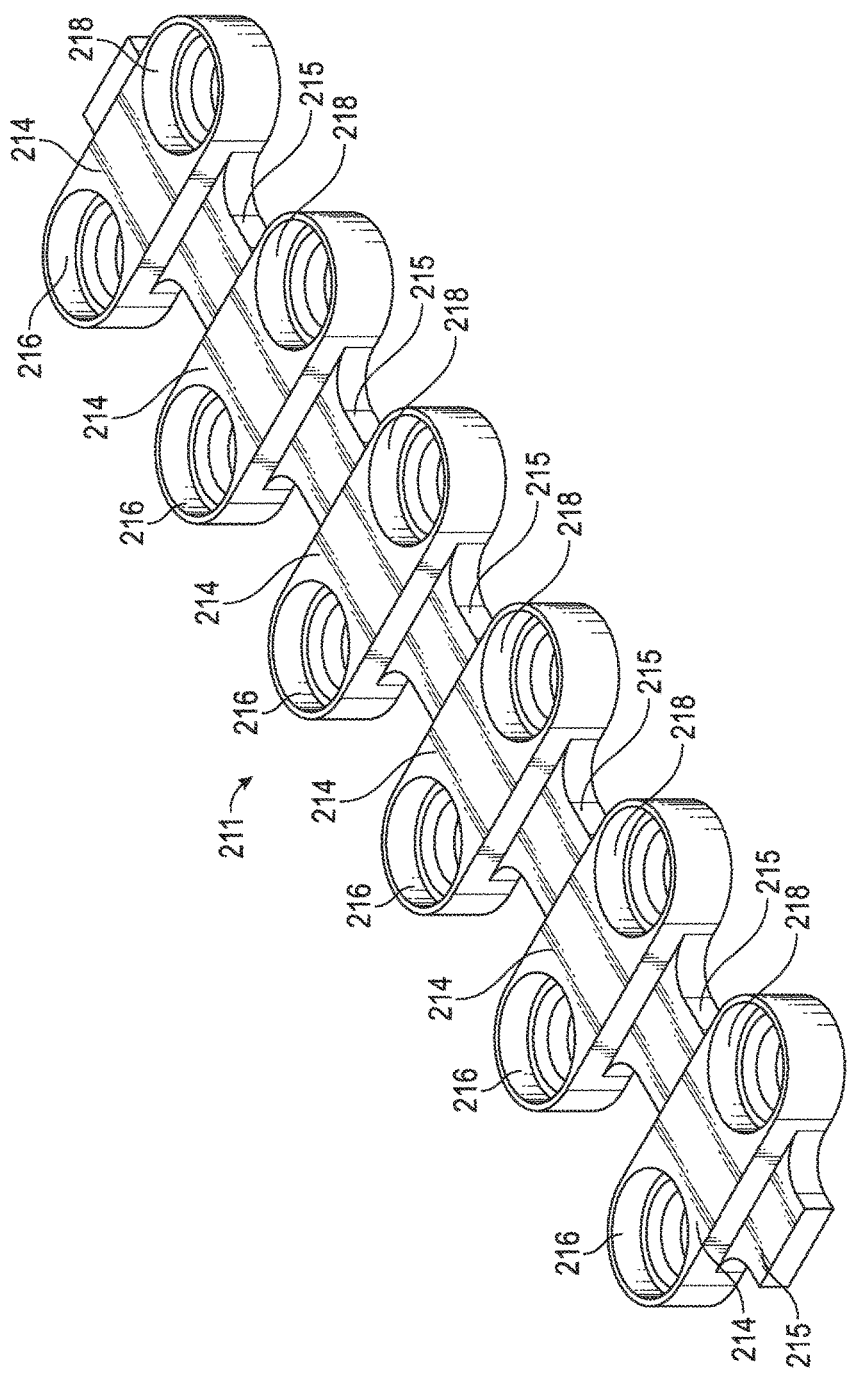

FIG. 39 illustrates a bottom view of the rail 18 (e.g., the portion that is secured to rail 12 or is covered when rail 18 is secured to rail 12) wherein openings 210 are formed therein and a portion of the rail under rib 26 is removed to form a channel 217. Channel 217 is configured to receive bridge member 215 so that insert 211 can be secured to the rail 18 from its bottom side. Accordingly, the insert 211 with its associated contacts 1035 from pins 48, which are secured to a printed circuit board, can be easily installed into the underside of rail 18 when insert 211 and its associated pins are secured to the printed circuit board illustrated in at least FIGS. 26A-26C.

Accordingly and as illustrated in at least FIGS. 38 and 41A-41C, when the pins 48 and their associated contact surfaces 1035 are inserted into openings 216 and 218 of insert 211 they are electrically insulated from the inner peripheral edges of openings 210 of rail 18 via a portion of feature 214 that defines openings 216 and 218 when insert 211 is secured to rail 18.

Figure 41A:
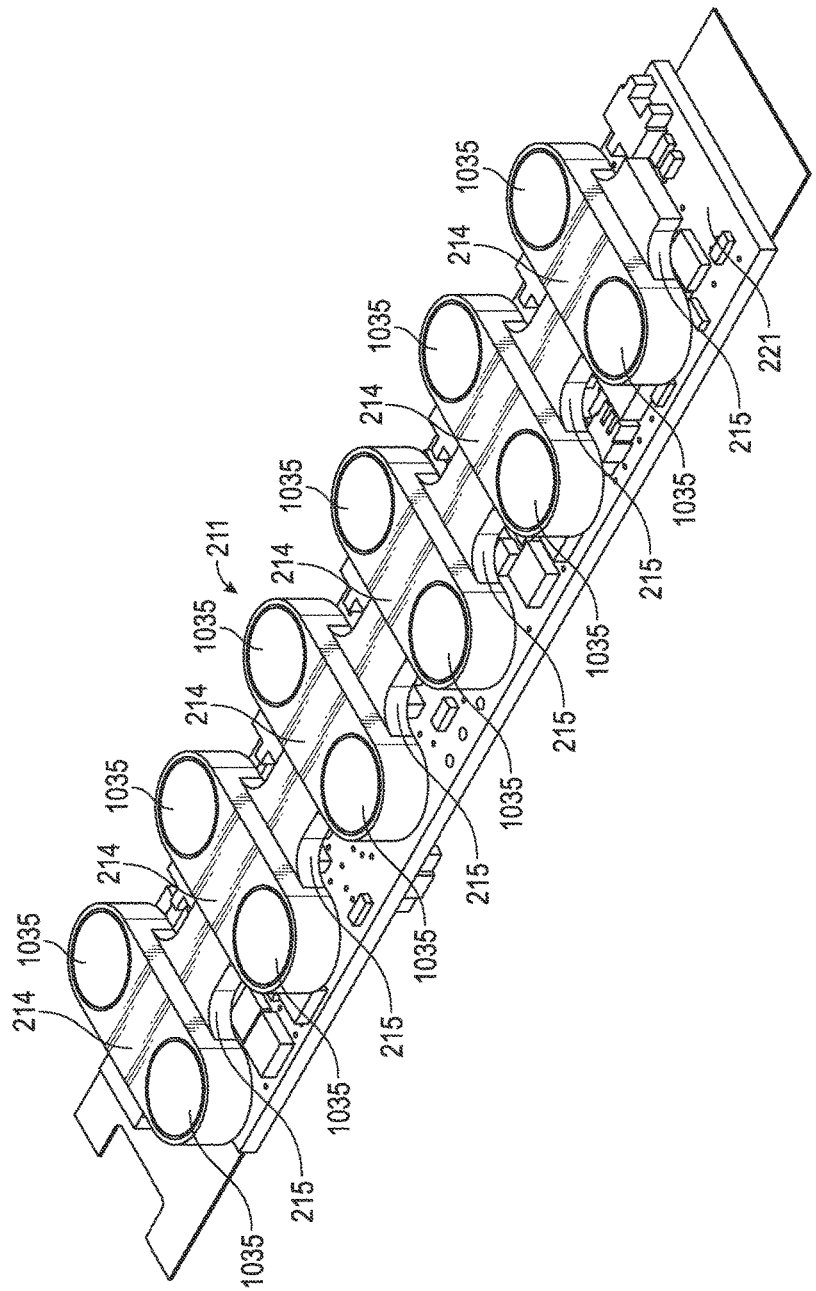

FIGS. 41A-41C illustrate the insert 211 secured to a printed circuit board 221 which includes some of the necessary electronics for operating the powered rail. In one non-limiting embodiment the insert 211 is formed from an easily molded plastic or polymer material for example a high temperature resistant and/or chemically resistant polymer or equivalents thereof. One non-limiting example of such a material is a PEEK plastic or poly ether ether ketone or equivalent thereof. Poly ether ether ketone (PEEK) is an organic polymer thermoplastic in the polyaryletherketone (PAEK) family, In yet another embodiment, the entire rail 18 or significant portions thereof can be manufactured from a molded plastic or polymer material for example a high temperature resistant and/or chemically resistant polymer or equivalents thereof. One non-limiting example of such a material is a PEEK plastic or poly ether ether ketone or equivalent thereof.

For 5.56 mm calibers a polymer rail 18 is contemplated. The polymer rail 18 allows for a reduction of weight over an aluminum rail. For larger calibers (higher impulse) than 5.56 mm such as 7.62 mm, 0.338, 50 cal., it may be desirable to provide an aluminum rail 18 or an aluminum rail with the above described insert 211, as illustrated and described with respect to FIGS. 38-41C, which utilizes the strength of an aluminum rail and inserting a polymer (PEEK) strip or insert 211 to house the contact pins. In these embodiments, the electronics are assembled or secured to the rail from the bottom of the rail. Accordingly, the pins with nickel or nickel alloy contact in a polymer insert secured to the bottom of the rail does not compromise the strength of the rail.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A networked battle system comprising:
a communication network;
a first rifle that includes at least one accessory coupled thereto that determines a bearing of the first rifle;
a communication element allowing the at least one accessory to provide bearing information to the communication network;
a battle management system in communication with the first rifle through the communication network that receives the bearing information from the accessory and updates a battle plan based on the bearing information to form an updated battle plan; and
a display screen coupled to the first rifle that displays the updated battle plan.

2. The networked battle system of claim 1, further comprising:
a battlefield device including a display device attached thereto;
wherein the battle management system provides the updated battle plan to the display device through the communication network.

3. The networked battle system of claim 2, wherein the updated battle plan is a map that includes an indication of a location of a target.

4. The networked battle system of claim 3, wherein the communication network is a wireless local area network (WLAN).

5. The networked battle system of claim 4, wherein the WLAN connects directly to the at least one accessory and the communication element is part of the at least one accessory.

6. The networked battle system of claim 2, wherein the first rifle further includes a laser distance measurement device and the updated battle plan is formed in part based on distance information received by the battle management system from the laser distance measurement device through the communications network.

7. The networked battle system of claim 2, wherein the battlefield device is a rifle that includes a microprocessor that receives the updated battle plan and provides it to the display device.

8. The networked battle system of claim 7, wherein the microprocessor connects directly to the communication network and includes the communication element.

9. The networked battle system of claim 7, wherein the communication element is a radio device in communication with the communication network and the microprocessor.

10. The networked battle system of claim 9, wherein the radio device is wirelessly coupled to the microprocessor.

11. The networked battle system of claim 9, wherein the radio device is coupled to the microprocessor through a cable or wire.

12. A networked battle system comprising:
a communication network;
a first battlefield device that includes at least one accessory coupled thereto that determines a location of the first battlefield device and a display device;
a distance determining device separate from the battlefield device, the distance determining providing a distance from it to a target and a location of the distance determining device to the communication network; and
a battle management system in communication with the first battlefield device and the distance determining device through the communication network that receives the distance determining device location and the distance to the target and updates a battle plan based the information from the distance determining device to form an updated battle plan.

13. The networked battle system of claim 12, wherein the battle management system provides the updated battle plan to the first battlefield device through the communication network.

14. The networked battle system of claim 12, wherein the first battlefield device is a rifle that includes a microprocessor that receives the updated battle plan and provides it to the display device.

15. The networked battle system of claim 12, wherein the at least one accessory is a global positioning device and includes the display device.

16. The networked battle system of claim 15, wherein the updated battle plan is a map that includes an indication of a location of the target.

17. The networked battle system of claim 16, wherein the communication network is a wireless local area network (WLAN).

18. The networked battle system of claim 17, wherein the WLAN connects directly to the at least one accessory and the communication element is part of the at least one accessory.

19. The networked battle system of claim 12, further comprising:
a firearm that includes at least one fire arm accessory coupled thereto that determines a location of the firearm and a display device.

20. The networked battle system of claim 19, wherein the battle management system provides the updated battle plan to the firearm through the communication network.

21. The networked battle system of claim 20, wherein the firearm includes a microprocessor that receives the updated battle plan and provides it to the display device.

22. The networked battle system of claim 19, wherein the at least one fire arm accessory is a global positioning device and includes the display device.

23. An indirect firing system comprising:
a firearm having a communication system;
an inclinometer that measures an inclination of the firearm;
a roll sensor that measures the roll angle of the firearm;
a bearing sensor that measures a bearing of a projectile that the firearm launches;
a computing device in communication with the communication system, the computing device, in operation, receiving bearing, roll and inclination information for the firearm from the communication system and displaying a map in a region near the firearm and a projected impact location of the projectile based on the bearing, roll and inclination information; and
at least one accessory coupled to the firearm that includes a display device that displays the map of the region and the projected impact location on the map.

24. The system of claim 23, further comprising:
a global positioning system (GPS) receiving device that receives an indication of the location of the firearm.

25. The system of claim 24, wherein the computing device selects the map based on the indication of the location of the firearm.

* * * * *